(12) United States Patent
Sano et al.

(10) Patent No.: US 6,657,705 B2
(45) Date of Patent: Dec. 2, 2003

(54) DISTANCE MEASURING APPARATUS

(75) Inventors: Naoki Sano, Oobu (JP); Emiko Isogai, Hekinan (JP); Ryoichi Sugawara, Nagoya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/175,508

(22) Filed: Jun. 20, 2002

(65) Prior Publication Data

US 2002/0196424 A1 Dec. 26, 2002

(30) Foreign Application Priority Data

Jun. 20, 2001 (JP) ..................... 2001-186530

(51) Int. Cl.[7] .................. G01B 11/26; G01C 3/08; B60T 7/16
(52) U.S. Cl. .................. 356/4.01; 356/141.1; 180/167
(58) Field of Search .................. 356/141.1, 5.01–5.15, 356/4.01; 180/167

(56) References Cited

U.S. PATENT DOCUMENTS

| | | | |
|---|---|---|---|
| 5,162,643 A | * | 11/1992 | Currie |
| 5,485,009 A | * | 1/1996 | Meyzonnetie et al. |
| 5,760,886 A | | 6/1998 | Miyazaki et al. |
| 5,949,365 A | | 9/1999 | Wagner |
| 6,137,566 A | * | 10/2000 | Leonard et al. |
| 6,229,597 B1 | * | 5/2001 | Kikuchi |
| 6,301,003 B1 | | 10/2001 | Shirai et al. |
| 6,327,029 B1 | * | 12/2001 | Matsuoka |
| 6,400,448 B1 | * | 6/2002 | Sugawara et al. |
| 6,535,275 B2 | * | 3/2003 | McCaffrey et al. |

FOREIGN PATENT DOCUMENTS

| | | |
|---|---|---|
| JP | 7-98381 | 4/1995 |
| JP | 7-218632 | 8/1995 |
| JP | 7-280557 | 10/1995 |
| JP | 10-288664 | 10/1998 |
| JP | 2000-56018 | 2/2000 |

* cited by examiner

Primary Examiner—Stephen C. Buczinski
(74) Attorney, Agent, or Firm—Posz & Bethards, PLC

(57) ABSTRACT

A distance measuring apparatus controls a forward laser beam to scan a detection area. A photodetector array includes a plurality of photo detecting elements. At least one is selected among the photo detecting elements as an effective element, and the effective element is changed from one to another in response to the direction of the forward laser beam. Identification is given of at least one among the photo detecting elements which receives an echo laser beam corresponding to the forward laser beam in a specified direction. An actual correspondence relation between directions of the forward laser beam and the photo detecting elements receiving corresponding echo laser beams is grasped on the basis of a relation between the identified photo detecting element and the specified direction. The selection and change of the effective element are executed according to the grasped actual correspondence relation.

15 Claims, 9 Drawing Sheets

FIG. 7

| LIGHT EMISSION DIRECTION (DETECTION AREA SEGMENT) | HORIZONTAL DISPLACEMENT FROM "A" | VERTICAL DISPLACEMENT FROM "A" | HORIZONTAL DISPLACEMENT FROM PIXEL "10" | VERTICAL DISPLACEMENT FROM PIXEL "10" | ID NUMBER OF PHOTO DETECTING PIXEL |
|---|---|---|---|---|---|
| A | 0 | 0 | 0 | 0 | 10 |
| B | 1 | 0 | 1 | 0 | 11 |
| C | 2 | 0 | 2 | 0 | 12 |
| D | 3 | 0 | 3 | 0 | 13 |
| E | 4 | 0 | 4 | −1 | 6 |
| F | 5 | 0 | 5 | −1 | 7 |
| G | 6 | 0 | 6 | −1 | 8 |
| H | 0 | 1 | 0 | 1 | 18 |
| I | 1 | 1 | 1 | 1 | 19 |
| J | 2 | 1 | 2 | 1 | 20 |
| K | 3 | 1 | 3 | 1 | 21 |
| L | 4 | 1 | 4 | 0 | 14 |
| M | 5 | 1 | 5 | 0 | 15 |
| N | 6 | 1 | 6 | 0 | 16 |
| O | 0 | 2 | 0 | 2 | 26 |
| P | 1 | 2 | 1 | 2 | 27 |
| Q | 2 | 2 | 2 | 2 | 28 |
| R | 3 | 2 | 3 | 1 | 21 |
| S | 4 | 2 | 4 | 1 | 22 |
| T | 5 | 2 | 5 | 1 | 23 |
| U | 6 | 2 | 6 | 1 | 24 |
| V | 0 | 3 | 0 | 3 | 34 |
| W | 1 | 3 | 1 | 3 | 35 |
| X | 2 | 3 | 2 | 3 | 36 |
| Y | 3 | 3 | 3 | 2 | 29 |
| Z | 4 | 3 | 4 | 2 | 30 |
| AA | 5 | 3 | 5 | 2 | 31 |
| AB | 6 | 3 | 6 | 2 | 32 |

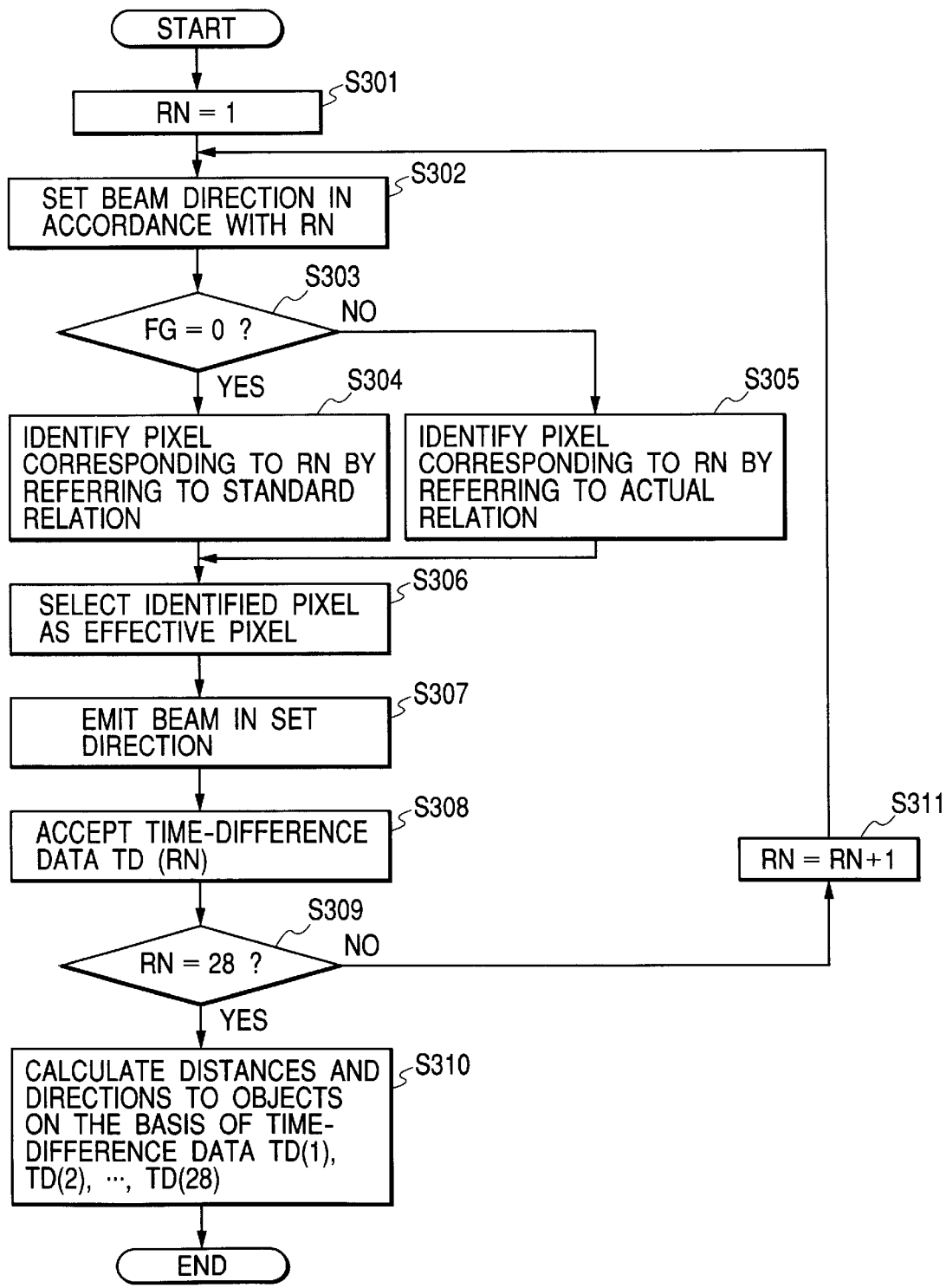

DISTANCE MEASURING APPARATUS

BACKGROUND OF THE INVENTION

1. Field of the Invention

This invention relates to a distance measuring apparatus which implements the steps of (1) emitting a forward laser beam into a detection area, (2) controlling the forward laser beam to scan the detection area, (3) receiving an echo laser beam caused by reflection of the forward laser beam at an object in the detection area, and (4) measuring the time interval between the moment of emission of the forward laser beam and the moment of reception of the corresponding echo laser beam as an indication of the distance to the object. In addition, this invention relates to a radar apparatus.

2. Description of the Related Art

A known distance measuring apparatus mounted on an automotive vehicle intermittently emits a forward laser beam into a detection area in front of the subject vehicle, and controls the forward laser beam to scan the detection area. The known apparatus receives an echo laser beam caused by reflection of the forward laser beam at an object in the detection area. The known apparatus measures the time interval between the moment of emission of the forward laser beam and the moment of reception of the corresponding echo laser beam as an indication of the distance to the object.

A receiver in the known apparatus has a light sensitive area for receiving echo laser beams. The light sensitive area is covered by an array of light sensitive cells. The broadening of the detection area requires an increase in the light sensitive area. A large light sensitive area tends to receive noise laser beams such as a laser beam emitted from a distance measuring apparatus mounted on an oncoming vehicle with respect to the subject vehicle, and an echo laser beam related to a distance measuring apparatus mounted on a vehicle traveling along a lane adjacent to the lane of the subject vehicle. The noise laser beams cause errors in the distance measurement.

U.S. Pat. No. 5,760,886 corresponding to Japanese patent application publication number 7-98381 discloses a scanning-type distance measuring device responsive to selected signals to reduce interference due to stray light or noise light. The device of U.S. Pat. No. 5,760,886 emits a beam of light. The emitted beam of light is reflected from an object and returns to one among photodetectors in a linear array or a two-dimensional array. Selection is made as to the outputs of the photodetectors on the basis of the position of the emitted beam of light. Therefore, photodetectors which should not contribute to the reflected beam are ignored according to the geometry of the emitted beam and the reflecting object. This approach in U.S. Pat. No. 5,760,886 reduces the effects of stray noise from other light sources. The selection of the photodetectors is synchronized with generation of the beam of light by a scanning light emitter in response to a position signal and an angular signal so as to minimize the stray-light-caused noise components of the selection-resultant final output signal.

U.S. Pat. No. 6,301,003 B1 corresponding to Japanese patent application publication number P2000-56018A discloses an optical distance measuring apparatus which transmits a laser beam in a cycle and scans a two-dimensional detection zone by the laser beam. The apparatus of U.S. Pat. No. 6,301,003 B1 includes a light sensitive unit for receiving a return of the laser beam from a target object in the detection zone. Data on the distance to the target object are generated on the basis of the reception of the return of the laser beam. The light sensitive unit is made of a two-dimensional matrix of cells which are selectively activated in each scan cycle for minimizing optical interference with the return of the laser beam from the target object. In each column of the matrix, cells are selectively and sequentially activated. Accordingly, information about the two-dimensional position of the target object is generated.

Japanese patent application publication number 7-280557 discloses a triangulation-based distance measuring apparatus which includes a pair of photosensor arrays. Each photosensor array has a plurality of photodiodes arranged in a line. One or more windows can be provided on each photosensor array. The size of every window is determined by the number of photodiodes composing the window. The number and size of windows on each photosensor array are changed depending on a target distance measurement range. Object images are projected onto the photosensor arrays. Regarding every object, two images are projected onto the photosensor arrays, respectively. The output signals from the photodiodes composing the windows are processed to calculate a phase difference between the object images on the respective photosensor arrays. The distance to an object is computed from the calculated phase difference according to triangulation. The change in the number and size of windows makes it possible to accurately measure both the distance to a near object and the distance to a far object.

Japanese patent application publication number 7-218632 discloses a distance measuring apparatus which includes a laser unit and a photodetector unit. The laser unit has three laser diodes for emitting forward laser beams into three divided regions (transmission-side regions) respectively. The photodetector unit has four photodiodes for receiving echo laser beams from four divided regions (reception-side regions) respectively. The direction along which the reception-side regions are arranged is the same as the direction of the arrangement of the transmission-side regions. The boundaries among the reception-side regions are offset from the boundaries among the transmission-side regions. The laser diodes are sequentially activated in a prescribed order. Thus, a forward laser beam is outputted sequentially from one of the laser diodes. Calculation is carried out about the time interval between the moment of emission of a forward laser beam and the moment of reception of a corresponding echo laser beam. The distance to an object reflecting the forward laser beam and hence causing the echo laser beam is detected on the basis of the calculated time interval. A decision is made as to which of the transmission-side regions corresponds to the forward laser beam. In addition, a decision is made as to which of the reception-side regions corresponds to the echo laser beam. Information about the decided transmission-side region and the decided reception-side region is used in detecting the direction toward the object.

U.S. Pat. No. 5,949,365 corresponding to Japanese patent application publication number 10-288664 discloses a multi-beam radar system in which more transmission elements than reception elements are present. The transmission elements present can be activated both individually and also in any desired simultaneous combination. An observable angular region can thereby be widened. An example of the system in U.S. Pat. No. 5,949,365 includes a first number of transmission elements for transmitting radar waves, and a second number of reception elements for receiving reflected radar waves. The second number is less than the first number. An effective antenna characteristic of the system results from a superimposition of a transmission characteristic of at least one of the transmission elements and a reception characteristic of at least one of the reception elements. The effective antenna characteristic can be modified for at least one measurement cycle by switching between the transmission and reception elements. The transmission elements can be activated individually or simultaneously in a selectable combination.

SUMMARY OF THE INVENTION

It is a first object of this invention to provide an improved distance measuring apparatus.

It is a second object of this invention to provide an improved radar apparatus.

A first aspect of this invention provides a distance measuring apparatus comprising scanning and applying means for applying a forward laser beam to a prescribed detection area, and controlling the forward laser beam to scan the detection area along a scanning direction; reflected light detecting means for receiving an echo laser beam caused by reflection of the forward laser beam at an object, the reflected light detecting means including a photodetector array in which a plurality of photo detecting elements are arranged in at least one of the scanning direction and a direction perpendicular to the scanning direction, the photodetector array having a visual field wider than a visual field corresponding to the detection area; changing and selecting means for selecting at least one among the photo detecting elements as an effective element and changing the effective element from one to another in response to a direction of the application of the forward laser beam; time difference measuring means for measuring a time difference between a moment of the application of the forward laser beam by the scanning and applying means and a moment of the reception of the echo laser beam by the reflected light receiving means; distance calculating means for calculating one of (1) a distance to the object and (2) a physical quantity indicative of the distance to the object on the basis of the time difference measured by the time difference measuring means; and correspondence relation grasping means for identifying at least one among the photo detecting elements which receives an echo laser beam corresponding to the forward laser beam applied in a specified direction, and for grasping an actual correspondence relation between directions of the application of the forward laser beam and the photo detecting elements receiving corresponding echo laser beams on the basis of a relation between the identified photo detecting element and the specified direction; wherein the changing and selecting means includes means for selecting at least one among the photo detecting elements as an effective element and changing the effective element from one to another in response to the direction of the application of the forward laser beam according to the actual correspondence relation grasped by the correspondence relation grasping means.

A second aspect of this invention is based on the first aspect thereof, and provides a distance measuring apparatus wherein the correspondence relation grasping means includes (1) means for identifying first one among the photo detecting elements which receives an echo laser beam corresponding to the forward laser beam applied in a first specified direction, (2) means for identifying second one among the photo detecting elements which receives an echo laser beam corresponding to the forward laser beam applied in a second specified direction different from the first specified direction, and (3) means for estimating one among the photo detecting elements which receives an echo laser beam corresponding to the forward laser beam applied in each of directions different from the first and second specified directions on the basis of a relation between the first and second identified photo detecting elements and the first and second specified directions.

A third aspect of this invention is based on the second aspect thereof, and provides a distance measuring apparatus wherein the first and second specified directions are two among different directions of the application of the forward laser beam, and an angular difference between the two directions is a greatest.

A fourth aspect of this invention is based on the second aspect thereof, and provides a distance measuring apparatus wherein the photodetector array includes a matrix array of photo detecting elements arranged in the scanning direction and also in the direction perpendicular to the scanning direction, wherein the scanning and applying means includes means for controlling the forward laser beam to scan the detection area along the scanning direction and also along the direction perpendicular to the scanning direction, and wherein the first and second specified directions correspond to corners of the detection area respectively.

A fifth aspect of this invention is based on the first aspect thereof, and provides a distance measuring apparatus wherein the correspondence relation grasping means includes (1) means for identifying first one among the photo detecting elements which receives an echo laser beam corresponding to the forward laser beam applied in a first specified direction, (2) means for identifying second one among the photo detecting elements which receives an echo laser beam corresponding to the forward laser beam applied in a second specified direction different from the first specified direction, (3) means for identifying third one among the photo detecting elements which receives an echo laser beam corresponding to the forward laser beam applied in a third specified direction different from the first and second specified directions, (4) means for identifying fourth one among the photo detecting elements which receives an echo laser beam corresponding to the forward laser beam applied in a fourth specified direction different from the first, second, and third specified directions, and (5) means for estimating one among the photo detecting elements which receives an echo laser beam corresponding to the forward laser beam applied in each of directions different from the first, second, third, and fourth specified directions on the basis of a relation between the first, second, third, and fourth identified photo detecting elements and the first, second, third, and fourth specified directions, wherein the photodetector array includes a matrix array of photo detecting elements arranged in the scanning direction and also in the direction perpendicular to the scanning direction, wherein the scanning and applying means includes means for controlling the forward laser beam to scan the detection area along the scanning direction and also along the direction perpendicular to the scanning direction, and wherein the first, second, third, and fourth specified directions correspond to corners of the detection area respectively.

A sixth aspect of this invention is based on the first aspect thereof, and provides a distance measuring apparatus wherein the correspondence relation grasping means includes (1) means for identifying one among the photo detecting elements which receives an echo laser beam corresponding to the forward laser beam applied in each of all directions of the application of the forward laser beam, and (2) means for grasping the actual correspondence relation on the basis of the identified photo detecting elements.

A seventh aspect of this invention is based on the first aspect thereof, and provides a distance measuring apparatus wherein the correspondence relation grasping means includes (1) means for storing data representing an ideal correspondence relation between directions of the application of the forward laser beam and the photo detecting elements receiving corresponding echo laser beams, (2) means for identifying one among the photo detecting elements which receives an echo laser beam corresponding to the forward laser beam applied in each of at least two different specified directions, (3) means for determining whether or not a relation between the identified photo detecting elements and the specified directions is accorded with the ideal correspondence relation, (4) means for, in cases where it is determined that the relation between the identified photo detecting elements and the specified directions is accorded with the ideal correspondence relation, setting the ideal corresponding relation as the actual correspondence relation, and (5) means for, in cases where it is determined that the relation between the identified photo detecting elements and the specified directions is not accorded with the ideal correspondence relation, grasping the actual correspondence relation on the basis of the relation between the identified photo detecting elements and the specified directions.

An eighth aspect of this invention is based on the first aspect thereof, and provides a distance measuring apparatus wherein the correspondence relation grasping means includes means for implementing the identification of the photo detecting element in response to intensities of echo laser beams received by the respective photo detecting elements.

A ninth aspect of this invention is based on the first aspect thereof, and provides a distance measuring apparatus wherein the correspondence relation grasping means includes means for implementing the identification of the photo detecting element in response to a center of gravity of a configuration of photo detecting elements receiving respective portions of an echo laser beam.

A tenth aspect of this invention is based on the first aspect thereof, and provides a distance measuring apparatus wherein the photodetector array includes a matrix array of photo detecting elements arranged in the scanning direction and also in the direction perpendicular to the scanning direction, and wherein the scanning and applying means includes means for controlling the forward laser beam to scan the detection area along the scanning direction and also along the direction perpendicular to the scanning direction.

An eleventh aspect of this invention is based on the first aspect thereof, and provides a distance measuring apparatus wherein the forward laser beam is of a cross section having a first dimension along the scanning direction and a second dimension along the direction perpendicular to the scanning direction, and the second dimension is greater than the first dimension, and wherein the photodetector array includes a plurality of photo detecting elements arranged in the direction perpendicular to the scanning direction.

A twelfth aspect of this invention is based on the first aspect thereof, and provides a distance measuring apparatus wherein the changing and selecting means includes means for individually selecting one among the photo detecting elements as an effective element and changing the effective element from one to another in response to the direction of the application of the forward laser beam.

A thirteenth aspect of this invention is based on the first aspect thereof, and provides a distance measuring apparatus which is mounted on a vehicle, wherein the scanning direction is equal to one of (1) a direction along a width of the vehicle and (2) a direction along a height of the vehicle.

A fourteenth aspect of this invention provides a radar apparatus comprising a photodetector array including a plurality of photo detecting pixels; first means for emitting a forward laser beam in specified one among prescribed forward beam directions and detecting one among the photo detecting pixels of the photodetector array which receives an echo laser beam caused by reflection of the emitted forward laser beam at an object, the prescribed forward beam directions corresponding to segments of a prescribed detection area respectively; second means for determining a correspondence relation between the prescribed forward beam directions and the photo detecting pixels of the photodetector array on the basis of a relation between the specified forward beam direction and the photo detecting pixel detected by the first means, the determined correspondence relation indicating which of the photo detecting pixels is expected to receive an echo laser beam when the forward laser beam is emitted in each of the prescribed forward beam directions; third means for emitting the forward laser beam and sequentially changing a direction of the emitted forward laser beam among the prescribed forward beam directions to sequentially apply the forward laser beam to the segments of the detection area and thereby scan the detection area; and fourth means for, when the forward laser beam is emitted in each of the prescribed forward beam directions by the third means, selecting one among the photo detecting pixels of the photodetector array as an effective pixel and setting others of the photo detecting pixels as ineffective pixels in accordance with the correspondence relation determined by the second means.

A fifteenth aspect of this invention provides a radar apparatus comprising a photodetector array including a plurality of photo detecting pixels; first means for applying a forward laser beam to specified one among segments of a prescribed detection area and detecting one among the photo detecting pixels of the photodetector array which receives an echo laser beam caused by reflection of the emitted forward laser beam at an object; second means for determining a correspondence relation between the segments of the detection area and the photo detecting pixels of the photodetector array on the basis of a relation between the specified segment and the photo detecting pixel detected by the first means, the determined correspondence relation indicating which of the photo detecting pixels is expected to receive an echo laser beam when the forward laser beam is applied to each of the segments of the detection area; third means for sequentially applying the forward laser beam to the segments of the detection area to scan the detection area; and fourth means for, when the forward laser beam is applied to each of the segments of the detection area by the third means, selecting one among the photo detecting pixels of the photodetector array as an effective pixel and setting others of the photo detecting pixels as ineffective pixels in accordance with the correspondence relation determined by the second means.

BRIEF DESCRIPTION OF THE DRAWINGS

FIG. 7 is a diagram of the relation among segments of a detection area (a scanned area), horizontal displacements (distances) from the right-lower corner segment, vertical displacements (distances) from the right-lower corner segment, horizontal displacements (distances) from the left-upper corner pixel, vertical displacements (distances) from the left-upper corner pixel, and the identification numbers of pixels of the photodetector array.

FIG. 13 is a flowchart of a distance-measurement-related segment of the control program for the processor section in FIG. 1.

DETAILED DESCRIPTION OF THE INVENTION

First Embodiment

Figure 1:
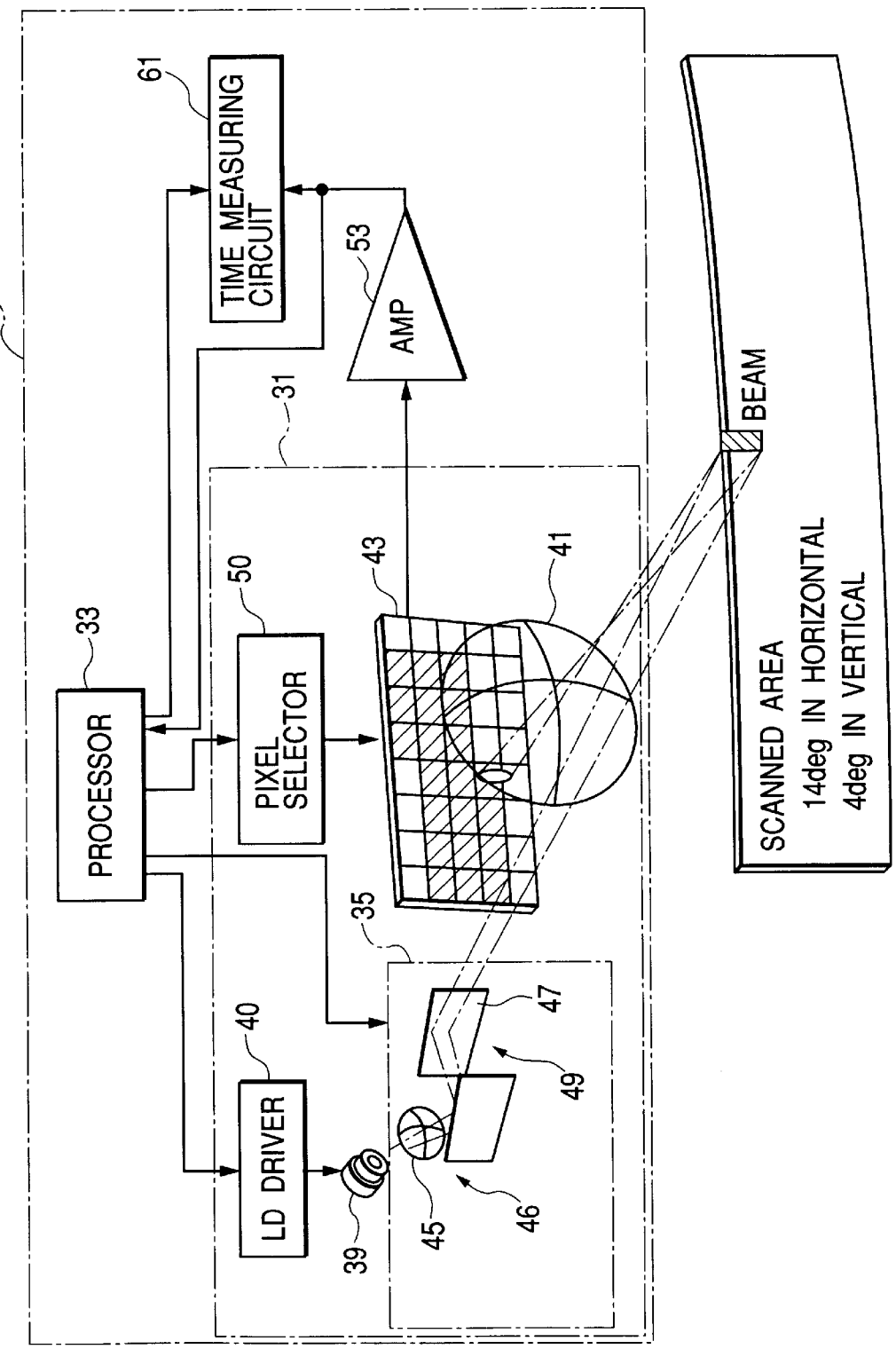
FIG. 1 is a diagram of a distance measuring apparatus (a radar apparatus) according to a first embodiment of this invention.

FIG. 1 shows a distance measuring apparatus (a radar apparatus) 1 according to a first embodiment of this invention. The distance measuring apparatus 1 is mounted on a vehicle referred to as a subject vehicle. The distance measuring apparatus 1 is designed to measure the distance between the subject vehicle and an object. Also, the distance measuring apparatus 1 functions to detect an object such as a preceding vehicle or an obstacle. Specifically, the distance measuring apparatus 1 can detect the position of an object relative to the subject vehicle.

The distance measuring apparatus 1 includes a transceiver section 31 and a processor section 33 as major sections. As shown in FIG. 1, the transceiver section 31 includes a scanning mechanism 35, a semiconductor laser diode 39, a light receiving lens 41, and a photodetector array (a photodiode array or a photo detecting element array) 43. The laser diode 39 emits a train of pulses of a laser beam toward the scanning mechanism 35. The scanning mechanism 35 directs the laser pulse beam toward a detection area. Thus, the scanning mechanism 35 emits a forward laser pulse beam toward the detection area. The forward laser pulse beam is controlled by the scanning mechanism 35 to scan the detection area. The detection area is also referred to as the scanned area. In general, the detection area (the scanned area) extends frontward of the subject vehicle. An object in the detection area reflects the forward laser pulse beam, causing an echo laser pulse beam (a return laser pulse beam). The echo laser pulse beam enters the light receiving lens 41. The echo laser pulse beam is focused on the photodetector array 43 by the light receiving lens 41. The photodetector array 43 outputs an electric signal which varies in accordance with the intensity of the received echo laser pulse beam. Preferably, the photodetector array 43 has a visual field wider than that corresponding to the detection area.

The transceiver section 31 further includes an LD (laser diode) driver 40 and a pixel selector 50. The LD driver 40 is connected between the laser diode 40 and the processor section 33. The pixel selector 50 is connected between the photodetector array 43 and the processor section 33. The photodetector array 43 is connected with an amplifier 53 followed by a time measuring circuit 61. The amplifier 53 is connected with the processor section 33. The time measuring circuit 61 is connected with the processor section 33.

The processor section 33 includes a programmable arithmetic circuit. Specifically, the processor section 33 includes a microcomputer, a CPU, a signal processor, or a similar device having a combination of an input/output circuit, a processing circuit, a ROM, a RAM, and a nonvolatile memory. The processor section 33 operates in accordance with a control program stored in the ROM. The control program is designed to enable the processor section 33 to execute operation steps indicated later.

A drive signal serving as a trigger signal is fed from the processor section 33 to the laser diode 39 via the LD driver 40. The laser diode 39 emits a train of pulses of a laser beam in response to the drive signal. The scanning mechanism 35 includes a diaphragm 45, a projector lens 46, a mirror 47, and a scanner 49. The diaphragm 45 receives the laser pulse beam from the laser diode 39. The diaphragm 45 shapes the received laser pulse beam into a laser pulse beam having approximately a rectangular cross section. The projector lens 46 following the diaphragm 45 further narrows the cross section of the laser pulse beam. The projector lens 46 applies the resultant laser pulse beam to the mirror 47 which is swung by the scanner 49. The laser pulse beam is reflected and deflected by the mirror 47, being applied to the detection area as a forward laser pulse beam. The direction of the travel of the forward laser pulse beam changes in accordance with the swing of the mirror 47 so that the forward laser pulse beam scans the detection area. The range in which the direction of the travel of the forward laser pulse beam changes corresponds to a predetermined angular range having a first prescribed dimension along the width-wise direction of the subject vehicle and a second prescribed dimension along the height direction of the subject vehicle.

The detection area (the predetermined angular range) corresponds to a scanned area provided by the scanning mechanism 35. The angular dimensions of the scanned area are 4 degrees in the vertical direction (the vehicle height direction), and 14 degrees in the horizontal direction (the lateral direction or the vehicle width-wise direction). The scanner 49 swings the mirror 47 to provide the lateral 14-degree angular change in the direction of the travel of the forward laser pulse beam. In addition, the scanner 49 swings the mirror 47 to provide the vertical 4-degree angular change in the direction of the travel of the forward laser pulse beam. The scanner 49 is connected with the processor section 33. The scanner 49 responds to a control signal fed from the processor section 33.

In the case where a galvano-mirror is used as the mirror 47, the scanner 49 includes a first mechanism for providing the lateral 14-degree angular change in the direction of the travel of the forward laser pulse beam, and a second mechanism for providing the vertical 4-degree angular change in the direction of the travel of the forward laser pulse beam.

The first mechanism is designed so that the galvano-mirror can be swung about a vertical shaft. The second mechanism is designed so that the first mechanism and also the galvano-mirror can be swung about a horizontal shaft.

A polygon mirror having surfaces of different inclination angles may be used as the mirror 47. In this case, the scanner 49 includes a mechanism for swinging or rotating the polygon mirror about a single shaft to provide the two-dimensional angular change in the direction of the travel of the forward laser pulse beam.

The photodetector array 43 has a two-dimensional matrix of photo detecting elements each including a photodiode (PD). The photo detecting elements are also referred to as the pixels or the photo detecting pixels. The size of the pixel matrix is designed to correspond to the 5-degree by 16-degree size greater than that of the scanned area. The dimension of the pixel matrix along the vertical direction (the vehicle height direction) corresponds to a predetermined number of photo detecting pixels which is equivalent to the 5-degree angle. The dimension of the pixel matrix along the lateral direction (the vehicle width-wise direction) corresponds to a predetermined number of photo detecting pixels which is equivalent to the 16-degree angle.

Figure 2:
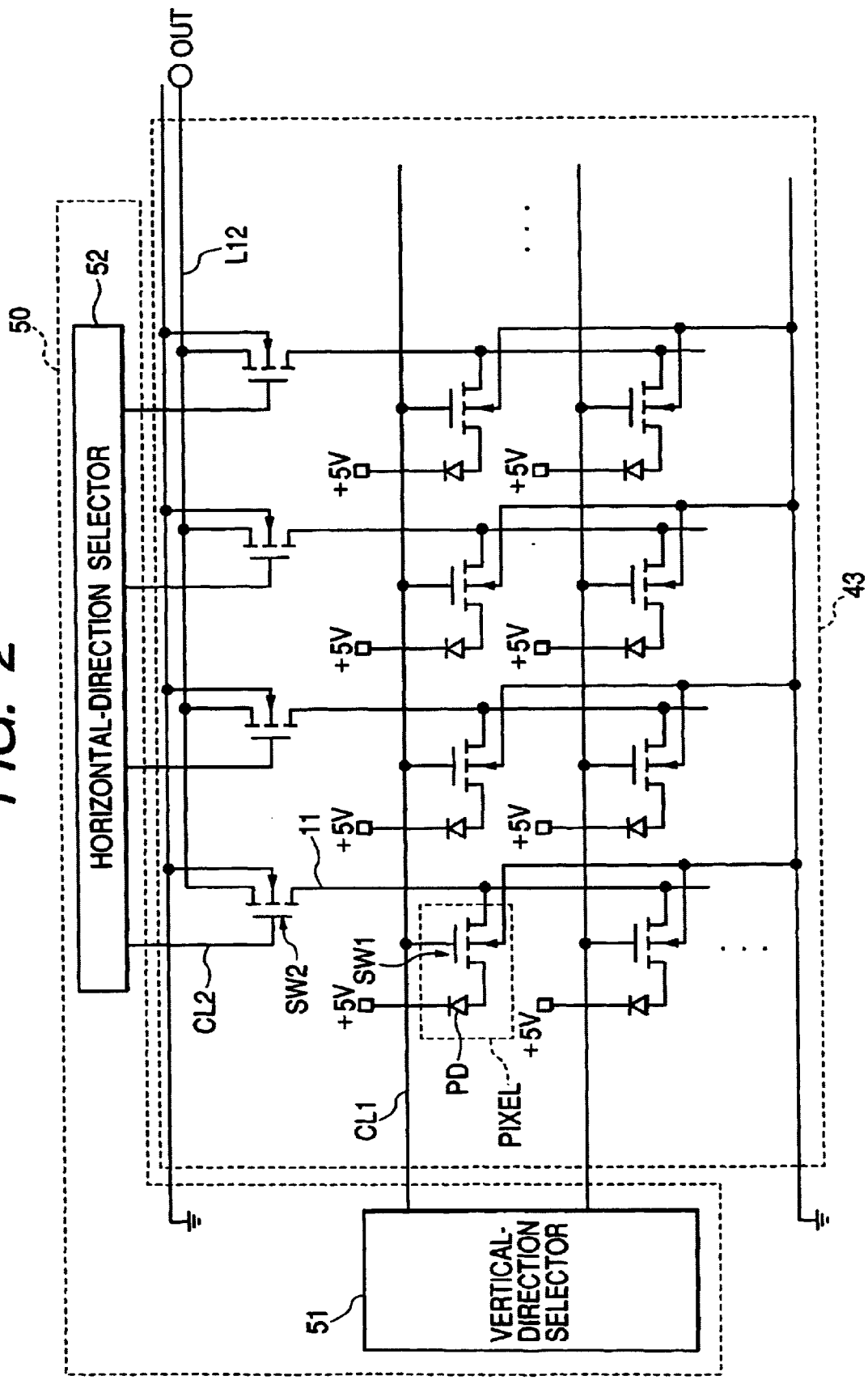
FIG. 2 is a diagram of a pixel selector and a portion of a photodetector array in FIG. 1.

FIG. 2 shows the pixel selector 50 and a portion of the pixel matrix which forms a portion of the photodetector array 43. As shown in FIG. 2, the pixel selector 50 includes a vertical-direction selector 51 and a horizontal-direction selector 52. The pixel matrix has rows and columns of photo detecting pixels. The vertical-direction selector 51 is connected with the rows of photo detecting pixels. The horizontal-direction selector 52 is connected with the columns of photo detecting pixels. The vertical-direction selector 51 functions to select one among the rows as an effective row (an actually used row). The horizontal-direction selector 52 functions to select one among the columns as an effective column (an actually used column). Accordingly, only a photo detecting pixel at an intersection between a selected row and a selected column is selected as an effective pixel (an actually used pixel). It should be noted that two or more photo detecting pixels may be simultaneously selected as effective pixels (actually used pixels). The vertical-direction selector 51 and the horizontal-direction selector 52 are connected with the processor section 33 (see FIG. 1). The vertical-direction selector 51 and the horizontal-direction selector 52 are controlled by the processor section 33.

In FIG. 2, the region surrounded by the broken lines shows one photo detecting pixel. Each photo detecting pixel contains a photodiode PD and a switch SW1. The photodiode PD forms a photo detecting zone (a photo detecting region). The cathode of the photodiode PD is connected to a positive dc power feed line. The switch SW1 is connected between the anode of the photodiode PD and a vertical-direction output line L11. The switch SW1 functions to selectively connect and disconnect the photodiode PD to and from the vertical-direction output line L11. The switch SW1 is connected to a control line CL1 leading from the vertical-direction selector 51. The switch SW1 can be controlled via the control line CL1.

In the matrix pixel array, photo detecting pixels are arranged along vertical and horizontal directions (column and row directions). The switches SW1 in photo detecting pixels in each horizontal-direction pixel group (each row-direction pixel group) are connected to a common control line CL1. Thus, the horizontal-direction pixel groups are assigned to the control lines CL1, respectively. The control lines CL1 lead from the vertical-direction selector 51. The switches SW1 in the pixels in each horizontal-direction group can be controlled via the related control line CL1. The switches SW1 in the pixels in each horizontal-direction group are simultaneously changed to their on states when a suitable voltage signal is applied to the related control line CL1. Photo detecting pixels in each vertical-direction pixel group (each column-direction pixel group) are connected to a common vertical-direction output line L11. Thus, the vertical-direction pixel groups are assigned to the vertical-direction output lines L11, respectively. The vertical-direction output lines L11 are connected via respective switches SW2 to a single last-stage output line L12 which leads to the amplifier 53 (see FIG. 1). The switches SW2 are connected to control lines CL2, respectively. Accordingly, the vertical-direction pixel groups are assigned to the control lines CL2, respectively. The control lines CL2 lead from the horizontal-direction selector 52. Each switch SW2 functions to selectively connect and disconnect the related vertical-direction output line L11 to and from the last-stage output line L12. Each switch SW2 can be controlled via the related control line CL2. Each switch SW2 is changed to its on state when a suitable voltage signal is applied to the related control line CL2.

With reference to FIG. 2, when the switch SW1 is in its on state (SW1=ON), a photo detection electric signal generated by the photodiode PD and resulting from photoelectric conversion of the incoming light is transmitted through the switch SW1 to the vertical-direction output line L11 and is then propagated along the vertical-direction output line L11. Under the condition that the switch SW2 is in its on state (SW2=ON), the photo detection electric signal is propagated from the vertical-direction output line L11 to the last-stage output line L12.

The control lines CL1 are connected to the vertical-direction selector 51. The control lines CL2 are connected to the horizontal-direction selector 52. The vertical-direction selector 51 and the horizontal-direction selector 52 cooperate to select one among the pixels in the photodetector array 43 by applying suitable control voltages to the control lines CL1 and CL2. Each switch SW1 is in its on state when the voltage at the related control line CL1 is high, and is in its off state when the voltage is low. Each switch SW2 is in its on state when the voltage at the related control line CL2 is high, and is in its off state when the voltage is low.

A first selecting process is such that the vertical-direction selector 51 applies a high voltage to only one of the control lines CL1 while applying a low voltage to the other control lines CL1. Therefore, only ones among the switches SW1 which are connected to the high-voltage control line CL1 are in their on states. Accordingly, one is selected among the horizontal-direction pixel groups (the row-direction pixel groups). The selected horizontal-direction pixel group corresponds to the high-voltage control line CL1. A second selecting process is such that the horizontal-direction selector 52 applies a high voltage to only one of the control lines CL2 while applying a low voltage to the other control lines CL2. Therefore, only one among the switches SW2 which is connected to the high-voltage control line CL2 is in its on state. Accordingly, one is selected among the vertical-direction pixel groups (the column-direction pixel groups). The selected vertical-direction pixel group corresponds to the high-voltage control line CL2. As a result of the first and second processes, only a pixel at the intersection between the selected horizontal-direction pixel group and the selected vertical-direction pixel group is selected as an effective pixel (an actually used pixel). It should be noted that two or more pixels can be simultaneously selected as effective pixels (actually used pixels).

The photo detection electric signal generated by the photodiode PD in the selected pixel (the effective pixel or the actually used pixel) is outputted via the related on-state switch SW1 to the related vertical-direction output line L11. The photo detection electric signal is propagated from the vertical-direction output line L11 to the last-stage output line L12 via the on-state switch SW2. Then, the photo detection electric signal is inputted into the amplifier 53 before passing therethrough and reaching the time measuring circuit 61. The photo detection electric signal may be amplified to a given level by an STC (sensitivity time control) circuit before being inputted into the amplifier 53. The intensity of the received echo laser pulse beam is inversely proportional to the fourth power of the distance to the object. When the object has a high reflectivity and is located near the vehicle, the intensity of the received echo laser pulse beam is excessively high. The STC circuit is effective in compensating for such a high intensity of the received echo laser pulse beam.

As previously mentioned, the processor section 33 outputs the drive signal to the LD driver 40. The processor section 33 feeds the drive signal to the time measuring circuit 61 also. The time measuring circuit 61 uses each pulse in the drive signal as a start pulse PA. The time measuring circuit 61 uses each pulse in the photo detection electric signal as a stop pulse PB. The time measuring circuit 61 detects the phase difference (that is, the time difference) between a start pulse PA and a related stop pulses PB. The time measuring circuit 61 encodes a signal of the detected phase difference into a binary digital signal (data). The time measuring circuit 61 outputs the binary digital signal (the data) to the processor section 33. The time measuring circuit 61 is able to calculate the numeric value of a short time difference. Even in the case where a plurality of stop pulses PB occur in response to one start pulse PA, the time measuring circuit 61 detects the time differences between the start pulse PA and the stop pulses PB. This means that the time measuring circuit 61 can implement multi-lap. During the multi-lap, the binary digital signal generated by the time measuring circuit 61 contains multi-lap data. The data (the binary digital signal) outputted from the time measuring circuit 61 represents the time difference which corresponds to the distance between the vehicle and the object. The data outputted from the time measuring circuit 61 are also referred to as the time-difference data or the distance data.

The processor section 33 outputs a control signal to the scanner 49 which determines the angular position of the mirror 47. The scanner 49 swings the mirror 47 in response to the control signal. The processor section 33 derives information of the angular position of the mirror 47 from the control signal. The processor section 33 receives the time-difference data (the distance data) from the time measuring circuit 61. The processor section 33 calculates the distance and direction to the object on the basis of the time-difference data and the information of the angular position of the mirror 47. The processor section 33 receives a vehicle speed signal from a vehicle speed sensor (not shown).

The distance measuring apparatus 1 operates as follows. The processor section 33 outputs a pulse of the drive signal to the LD driver 40 as a trigger for light emission from the laser diode 39. As a result, the laser diode 39 emits a pulse of the laser beam. The emitted laser pulse is directed and applied to the detection area by the diaphragm 45, the projector lens 46, and the mirror 47 as a forward laser pulse. When the forward laser pulse meets an object, the forward laser pulse is reflected thereby and changes to an echo laser pulse (or echo laser pulses). The echo laser pulse passes through the light receiving lens 41, and then reaches the photodetector array 43. The photodetector array 43 converts the received echo laser pulse into a photo detection electric signal depending on the intensity of the received echo laser pulse. The photo detection electric signal is transmitted from the photodetector array 43 to the time measuring circuit 61 via the amplifier 53. The processor section 33 outputs the pulse of the drive signal to the time measuring circuit 61 also. The time measuring circuit 61 detects the time difference between the pulse of the drive signal and a pulse in the photo detection electric signal. The time measuring circuit 61 generates distance data (time-difference data) on the basis of the detected time difference. The time measuring circuit 61 outputs the distance data to the processor section 33. When the photo detection electric signal has a plurality of pulses, the time measuring circuit 61 detects the time differences between the pulse of the drive signal and the pluses in the photo detection electric signal. The time measuring circuit 61 generates multi-lap distance data (multi-lap time-difference data) on the basis of the detected time differences. The time measuring circuit 61 outputs the multi-lap distance data to the processor section 33. A RAM (not shown) within the processor section 33 stores the distance data outputted from the time measuring circuit 61. The processor section 33 corrects the time difference represented by the distance data in response to a response lag caused by the photodetector array 43 and a delay time caused by the amplifier 53. The processor section 33 calculates the distance L to the object on the basis of the correction-resultant time difference and the light velocity. The processor section 33 generates accurate distance data representing the calculated distance L.

The accurate distance data may be replaced by data of another physical quantity indicating the accurate distance. For example, the accurate distance data may be replaced by the accurate time difference data. Specifically, the correction-resultant time difference which results from consideration of the response lag and the delay time may be used instead of the distance L. Preferably, the processor section 33 generates such accurate distance data or accurate time difference data when receiving the output data from the time measuring circuit 61.

The processor section 33 drives the scanner 49, thereby swinging the mirror 47 and causing the forward laser pulse beam to scan the detection area. The direction of the travel of the forward laser pulse beam is changed among prescribed directions in a two-dimensional angular range of 14 degrees in horizontal and 4 degrees in vertical which extends forward of the subject vehicle, and which corresponds to the detection area (the scanned area). For every prescribed forward beam direction, at least one pulse of the forward laser beam is applied to the detection area.

Figure 3:
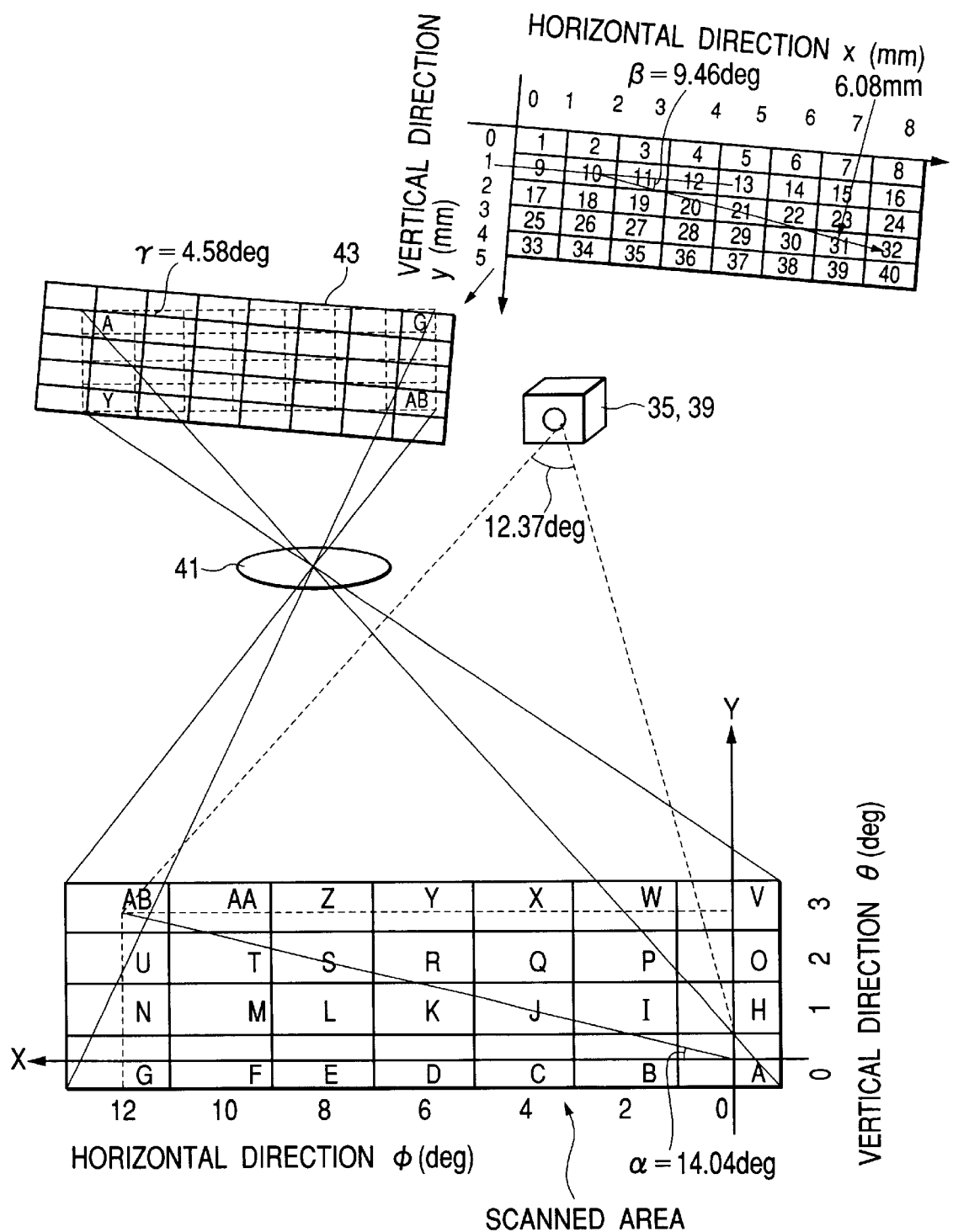
FIG. 3 is a diagram of a light emitting system and a light receiving system in the distance measuring apparatus of FIG. 1.

As shown in FIG. 3, the detection area is divided into 28 segments "A", "B", . . . , "Y", "Z", "AA", and "AB" arranged in a matrix of 7 segments in a horizontal direction by 4 segments in a vertical direction. Each of the segments "A", . . . , and "AB" has a horizontal dimension corresponding to 2 degrees and a vertical dimension corresponding to 1 degree. In FIG. 3, the horizontal direction and the vertical direction are denoted by the X axis and the Y axis, respectively. Preferably, the cross section of the forward laser beam has horizontal and vertical dimensions equivalent to those of each detection-area segment. In this case, the forward laser beam can fully cover each detection-area segment. During every scanning of the detection area, the forward laser pulse beam is sequentially applied to the 28 segments "A", . . . , and "AB". Specifically, the direction of the forward laser pulse beam is sequentially changed among 28 prescribed directions corresponding to the 28 segments "A", ..., and "AB" respectively. The 28 prescribed forward beam directions corresponding to the 28 segments "A", ..., and "AB" are also denoted by the characters "A", ..., and "AB", respectively.

The detection area is scanned in a way as follows. In FIG. 3, the X axis corresponds to a main scanning direction while the Y axis corresponds to a sub scanning direction. The detection area has 4 horizontal rows each having 7 segments. The 4 horizontal rows correspond to 4 horizontal scanning lines, respectively. Firstly, the direction of the forward laser pulse beam is sequentially changed among the prescribed directions "A", "B", "C", "D", "E", "F", and "G". Thus, the detection-area segments "A", "B", "C", "D", "E", "F", and "G" in the lowermost horizontal row (the first horizontal scanning line) are sequentially exposed to the forward laser pulse beam in that order. Secondly, the direction of the forward laser pulse beam is sequentially changed among the prescribed directions "H", "I", "J", "K", "L", "M", and "N". Thus, the detection-area segments "H", "I", "J", "K", "L", "M", and "N" in the second lowermost horizontal row (the second horizontal scanning line) are sequentially exposed to the forward laser pulse beam in that order. Thirdly, the direction of the forward laser pulse beam is sequentially changed among the prescribed directions "O", "P", "Q", "R", "S", "T", and "U". Thus, the detection-area segments "O", "P", "Q", "R", "S", "T", and "U" in the second uppermost horizontal row (the third horizontal scanning line) are sequentially exposed to the forward laser pulse beam in that order. Finally, the direction of the forward laser pulse beam is sequentially changed among the prescribed directions "V", "W", "X", "Y", "Z", "AA", and "AB". Thus, the detection-area segments "V", "W", "X", "Y", "Z", "AA", and "AB" in the uppermost horizontal row (the fourth horizontal scanning line) are sequentially exposed to the forward laser pulse beam in that order. Accordingly, the scanning of the detection area is started from the right-lower corner segment "A" toward the left-upper corner segment "AB". Thus, the change of the direction of the forward laser pulse beam is started from the right-lower corner direction "A" toward the left-upper corner direction "AB".

During every scanning of the detection area, the scanner 49 sequentially changes the direction of the forward laser pulse beam among the 28 prescribed directions "A", ..., and "AB". When the forward laser pulse beam is in each of the prescribed directions "A", ..., and "AB", that is, when the forward laser pulse beam is applied to each of the detection-area segments "A", ..., and "AB", one pixel in the matrix pixel array in the photodetector array 43 is expected to receive an echo laser pulse beam. The pixel expected to receive an echo laser pulse beam depends on which of the prescribed directions "A", ..., and "AB" the forward laser pulse beam is currently in. For each of the 28 prescribed directions "A", ..., and "AB" of the forward laser pulse beam, the pixel expected to receive an echo laser pulse beam is determined, and only the determined pixel is selected as an effective pixel (an actually used pixel). Accordingly, one is selected among the pixels of the photodetector array 43 as an effective pixel in accordance with the direction of the forward laser pulse beam.

Figure 4:
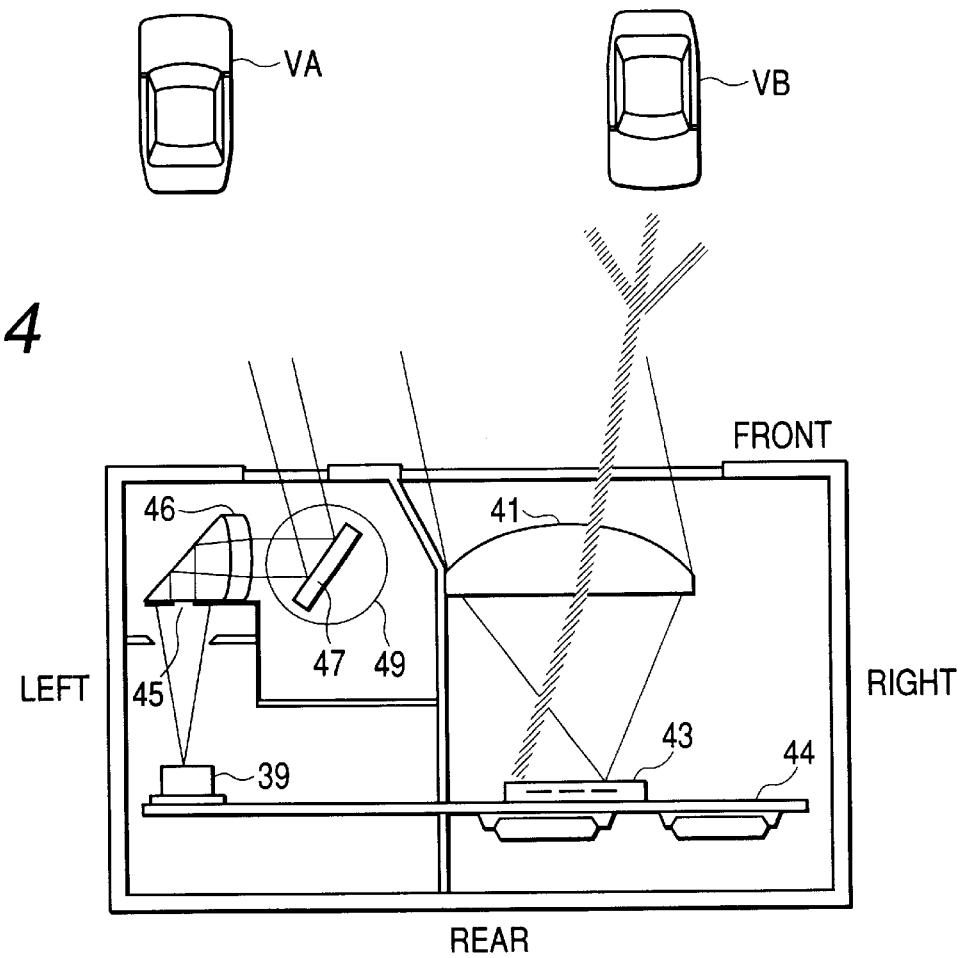
FIG. 4 is a diagram of vehicles and the distance measuring apparatus in FIG. 1.

With reference to FIG. 4, in the case where a vehicle VA is a distance measurement object, an echo laser pulse beam (a reflected laser pulse beam) from the object is expected to reach a right-hand part of the photodetector array 43 via the light receiving lens 41. In the photodetector array 43, a pixel expected to receive an echo laser pulse beam is identified, and only the identified pixel is selected as an effective pixel (an actually used pixel).

As previously mentioned, one is selected among the pixels of the photodetector array 43 as an effective pixel in accordance with the direction of the forward laser pulse beam. In this case, it is possible to reduce the adverse affection of stray light or noise light. With reference to FIG. 4, when a vehicle VB is running on the opposite lane with respect to the subject vehicle, a laser beam emitted from a distance measuring apparatus on the vehicle VB is expected to reach a left-hand part of the photodetector array 43. During a time interval except the moment at which a correct echo laser pulse beam is expected to reach the left-hand part of the photodetector array 43, all the pixels in the left-hand part of the photodetector array 43 remain non-selected and ineffective. Therefore, it is possible to prevent the adverse affection of the laser beam emitted from the vehicle VB.

Figure 5:
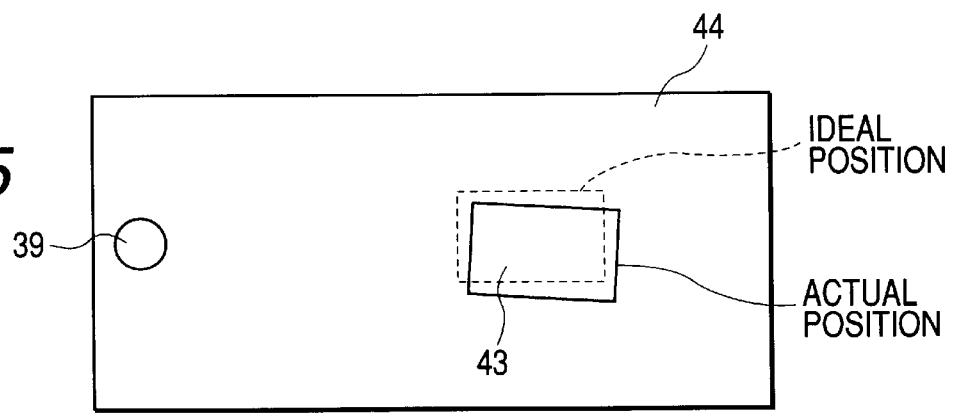
FIG. 5 is a diagram of a laser diode, the photodetector array, and a related support board in the distance measuring apparatus of FIG. 1.

As shown in FIG. 5, the laser diode 39 and the photodetector array 43 are mounted on a common support board 44 such as a substrate or a printed circuit board. When there is sufficient consistency in optical-axis position and angle between a light emitting system including the laser diode 39 and a light receiving system including the photodetector array 43, it is easy to correctly identify one of the pixels of the photodetector array 43 which is expected to receive an echo laser pulse beam corresponding to a forward laser pulse beam. Here, consistency includes optical-axis and angular alignment between the light emitting system and the light receiving system. The light emitting system further includes the diaphragm 45, the projector lens 46, the mirror 47, and the scanner 49. The light receiving system further includes the light receiving lens 41. An ideal position of the photodetector array 43 which is shown in FIG. 5 is defined under the condition that the light emitting system and the light receiving system are sufficiently consistent with each other in optical-axis position and angle. In fact, the photodetector array 43 tends to deviate from its ideal position. Similarly, other parts and elements of the light emitting system and the light receiving system tend to deviate from their ideal positions. The distance measuring apparatus 1 is designed to compensate for insufficient consistency in optical-axis position and angle between the light emitting system and the light receiving system regarding the identification of each photo detecting pixel expected to receive an echo laser pulse beam.

As shown in FIG. 3, the 28 segments "A", ..., and "AB" of the detection area are arranged in a two-dimensional matrix of 7 segments in the horizontal direction (the X-axis direction) by 4 segments in the vertical direction (the Y-axis direction). The pixel matrix forming the photodetector array 43 is of 40 photo detecting pixels being 8 pixels in a horizontal direction (an x-axis direction) by 5 pixels in a vertical direction (a y-axis direction). The 40 pixels are respectively assigned serial identification numbers of "1", "2", "3", ..., and "40" in the order from the left-upper corner pixel to the right-lower corner pixel. In the case where the light emitting system and the light receiving system are sufficiently consistent with each other concerning optical-axis position and angle, that is, in the case where the light emitting system and the light receiving system are in an ideal positional and angular relation, when the direction of the forward laser pulse beam is sequentially changed among the prescribed directions "A", "B", "C", "D", "E", "F", and "G" corresponding to the detection-area segments "A", "B", "C", "D", "E", "F", and "G", a photo detecting pixel expected to receive an echo laser pulse beam changes as "1", "2", "3", "4", "5", "6", and "7" in identification number respectively. When the direction of the forward laser pulse beam is sequentially changed among the prescribed directions "H", "I", "J", "K", "L", "M", and "N" corresponding to the detection-area segments "H", "I", "J", "K", "L", "M", and "N", a photo detecting pixel expected to receive an echo laser pulse beam changes as "9", "10", "11", "12", "13", "14", and "15" in identification number respectively. When the direction of the forward laser pulse beam is sequentially changed among the prescribed directions "O", "P", "Q", "R", "S", "T", and "U" corresponding to the detection-area segments "O", "P", "Q", "R", "S", "T", and "U", a photo detecting pixel expected to receive an echo laser pulse beam changes as "17", "18", "19", "20", "21", "22", and "23" in identification number respectively. When the direction of the forward laser pulse beam is sequentially changed among the prescribed directions "V", "W", "X", "Y", "Z", "AA", and "AB" corresponding to the detection-area segments "V", "W", "X", "Y", "Z", "AA", and "AB", a photo detecting pixel expected to receive an echo laser pulse beam changes as "25", "26", "27", "28", "29", "30", and "31" in identification number respectively. This correspondence relation between the 28 forward beam directions "A", . . . , and "AB" and the pixels of the photodetector array 43 which receive related echo laser pulse beams respectively is referred to as the standard correspondence relation. The standard correspondence relation between the 28 forward beam directions "A", . . . , and "AB" and the pixels of the photodetector array 43 is equivalent to the standard correspondence relation between the 28 segments "A", . . . , and "AB" of the detection area and the pixels of the photodetector array 43. Data representing the standard correspondence relation between the 28 forward beam directions "A", . . . , and "AB" and the pixels of the photodetector array 43 are stored in the nonvolatile memory within the processor section 33. The data representing the standard correspondence relation may be stored in a nonvolatile memory provided outside and connected with the processor section 33.

The distance measuring apparatus 1 is operated in an adjustment mode before being actually used for distance measurement. The adjustment mode of operation of the distance measuring apparatus 1 is executed after the apparatus 1 has been assembled. Before the adjustment mode of operation of the distance measuring apparatus 1 is started, a suitable reflective object or objects are placed at positions meeting the prescribed forward beam directions "A" and "AB" corresponding to the right-lower corner and left-upper corner of the detection area.

Figure 6:
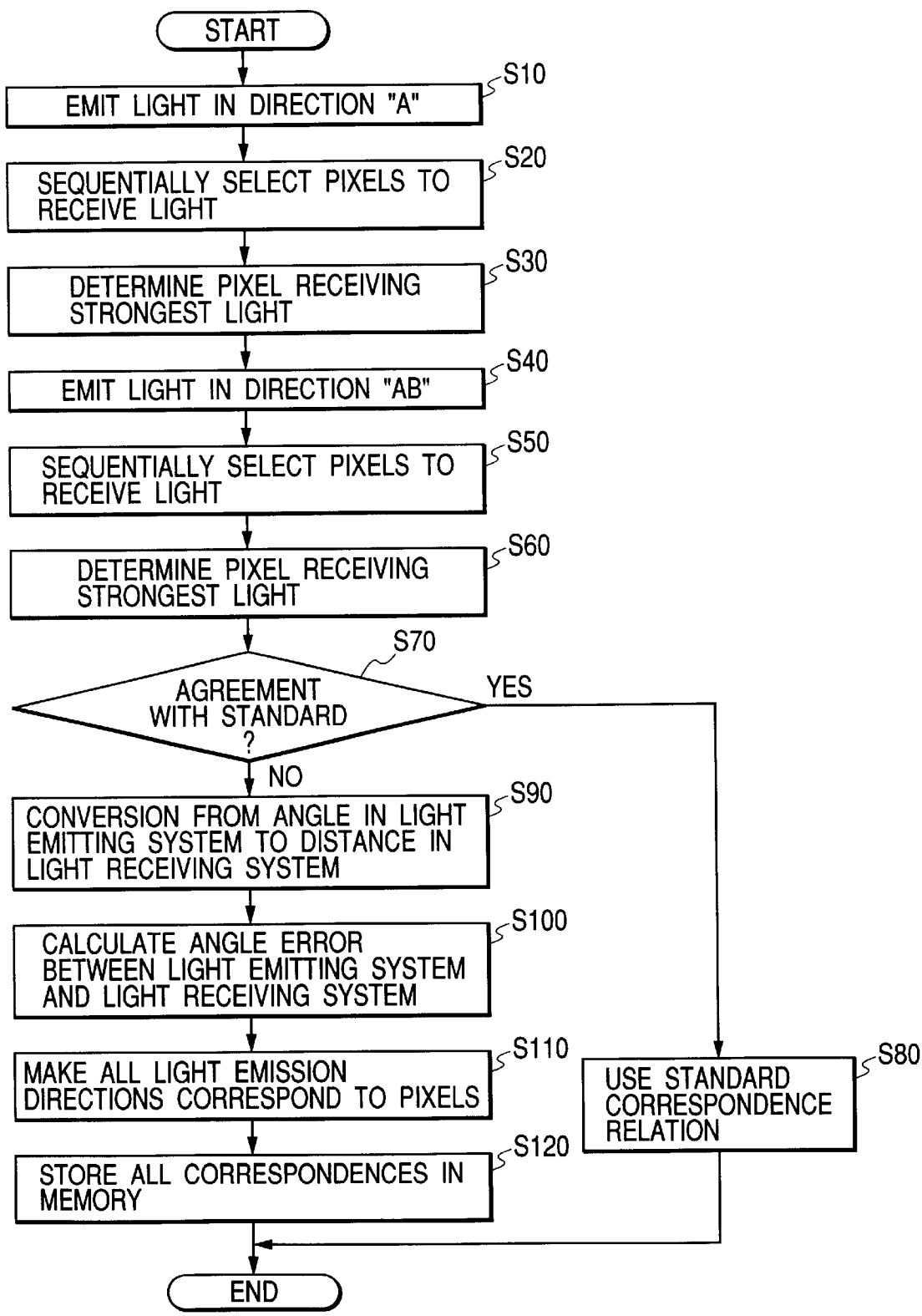
FIG. 6 is a flowchart of an adjustment-related segment of a control program for a processor section in FIG. 1.

As previously mentioned, the processor section 33 operates in accordance with the control program stored in the internal ROM. FIG. 6 is a flowchart of a segment of the control program which relates to the adjustment mode of operation of the distance measuring apparatus 1.

As shown in FIG. 6, a first step S10 of the program segment controls the LD driver 40 and the scanner 49 to emit a forward laser beam in the prescribed direction "A". Thus, the forward laser beam is applied to the right-lower corner segment "A" of the detection area.

A step S20 following the step S10 controls the pixel selector 50 to sequentially select one among candidate photo detecting pixels as an effective pixel. The candidate pixels include the ideally corresponding pixel having an identification number of "1", and the pixels having identification numbers of "2", "9", and "10" and neighboring the ideally corresponding pixel. The step S20 detects the intensity of a received echo laser beam from the output signal of the amplifier 53 for each candidate pixel selected. Thus, the step S20 provides the detected echo intensities for the candidate pixels respectively.

A step S30 subsequent to the step S20 compares the detected echo intensities to decide the greatest thereof. The step S30 determines one among the candidate pixels which relates to the greatest echo intensity. The step S30 considers the greatest-echo-intensity candidate pixel to be in actual correspondence with the prescribed forward beam direction "A" (or the right-lower corner segment "A" of the detection area). Specifically, the step S30 regards the identification number of the greatest-echo-intensity candidate pixel as actually corresponding to the prescribed forward beam direction "A". The step S30 loads the RAM with a signal representing the identification number of the greatest-echo-intensity candidate pixel, that is, the identification number of the pixel actually corresponding to the prescribed forward beam direction "A" (or the right-lower corner segment "A" of the detection area).

A step S40 following the step S30 controls the LD driver 40 and the scanner 40 to emit a forward laser beam in the prescribed direction "AB". Thus, the forward laser beam is applied to the left-upper corner segment "AB" of the detection area.

A step S50 subsequent to the step S40 controls the pixel selector 50 to sequentially select one among candidate photo detecting pixels as an effective pixel. The candidate pixels include the ideally corresponding pixel having an identification number of "31", and the pixels having identification numbers of "22", "23", "24", "30", "32", "38", "39", and "40" and neighboring the ideally corresponding pixel. The step S50 detects the intensity of a received echo laser beam from the output signal of the amplifier 53 for each candidate pixel selected. Thus, the step S50 provides the detected echo intensities for the candidate pixels respectively.

A step S60 following the step S50 compares the detected echo intensities to decide the greatest thereof. The step S60 determines one among the candidate pixels which relates to the greatest echo intensity. The step S60 considers the greatest-echo-intensity candidate pixel to be in actual correspondence with the prescribed forward beam direction "AB" (or the left-upper corner segment "AB" of the detection area). Specifically, the step S60 regards the identification number of the greatest-echo-intensity candidate pixel as actually corresponding to the prescribed forward beam direction "AB". The step S60 loads the RAM with a signal representing the identification number of the greatest-echo-intensity candidate pixel, that is, the identification number of the pixel actually corresponding to the prescribed forward beam direction "AB" (or the left-upper corner segment "AB" of the detection area).

The steps S10, S20, and S30 are designed to use the prescribed forward beam direction "A" and the right-lower corner segment "A" of the detection area as a first adjustment-base direction and a first adjustment-base segment respectively. The steps S40, S50, and S60 are designed to use the prescribed forward beam direction "AB" and the left-upper corner segment "AB" of the detection area as a second adjustment-base direction and a second adjustment-base segment respectively.

A step S70 subsequent to the step S60 determines whether or not the identification numbers of the pixels actually corresponding to the prescribed forward beam directions "A" and "AB" (the first and second adjustment-base directions) agree with identification numbers of "1" and "31" respectively. Identification numbers of "1" and "31" mean those of the pixels ideally corresponding to the prescribed forward beam directions "A" and "AB" respectively. When the identification numbers of the pixels actually corresponding to the prescribed forward beam directions "A" and "AB" agree with identification numbers of "1" and "31" respectively, the program advances from the step S70 to a step S80. Otherwise, the program advances from the step S70 to a step S90.

The step S80 executes a process of allowing the standard correspondence relation between the 28 forward beam directions "A", ..., and "AB" and the pixels of the photodetector array 43 to be used in later distance measurement. Specifically, the step S80 sets a relation designating flag FG to "0". After the step S80, the current execution cycle of the program segment ends.

The step S90 and subsequent steps are designed for determining the actual correspondence relation between the 28 forward beam directions "A", ..., and "AB" and the pixels of the photodetector array 43 which receive related echo laser pulse beams respectively. The actual correspondence relation between the 28 forward beam directions "A", ..., and "AB" and the pixels of the photodetector array 43 is equivalent to the actual correspondence relation between the 28 segments "A", ..., and "AB" of the detection area and the pixels of the photodetector array 43. The step S90 and subsequent steps will be described below on the assumption that the identification numbers of the pixels actually corresponding to the prescribed forward beam directions "A" and "AB" are "10" and "32" respectively.

Firstly, the step S90 calculates a forward-beam angular difference concerning the light emitting system. With respect to the forward laser beam, there is a 6-segment difference along the horizontal direction (the X-axis direction) between the right-lower corner segment "A" and the left-upper corner segment "AB" of the detection area. There is a 3-segment difference along the vertical direction (the Y-axis direction) between the right-lower corner segment "A" and the left-upper corner segment "AB". Each segment of the detection area corresponds to an angle of 2 degrees in the horizontal direction (the X-axis direction), and corresponds to an angle of 1 degree in the vertical direction (the Y-axis direction). Thus, the step S90 approximately calculates the angular difference between the forward laser beam applied to the right-lower corner segment "A" and that applied to the left-upper corner segment "AB" according to the following equation.

$$\sqrt{(6\cdot 2 \text{ degrees})^2 + (3\cdot 1 \text{ degree})^2} = 12.37 \text{ degrees}$$

Secondly, the step S90 calculates an inter-pixel distance in the light receiving system. There is a 6-pixel distance along the horizontal direction (the x-axis direction) between the pixel having an identification number of "10" and the pixel having an identification number "32" in the photodetector array 43. There is a 2-pixel distance along the vertical direction (the y-axis direction) between the pixel "10" and the pixel "32". Here, the pixel "k" means the pixel having an identification number of "k". Each pixel of the photodetector array 43 corresponds to 1 mm in the horizontal direction (the x-axis direction), and corresponds to 0.5 mm in the vertical direction (the y-axis direction). Thus, the step S90 calculates the resultant distance between the pixel "10" and the pixel "32" according to the following equation.

$$\sqrt{(6\cdot 1 \text{ mm})^2 + (2\cdot 0.5 \text{ mm})^2} = 6.08 \text{ mm}$$

Therefore, the step S90 finds that a forward-beam angular difference of 12.37 degrees corresponds to a distance of 6.08 mm on the photodetector array 43.

A step S100 subsequent to the step S90 calculates an angular error between the light emitting system and the light receiving system. Firstly, the step S100 computes an angle "α" concerning the light emitting system. As shown in FIG. 3, the angle "α" is defined between the horizontal direction (the X-axis direction) and the line connecting the centers of the detection-area corner segments "A" and "AB". Specifically, the step S100 computes the angle "α" according to the following equation.

$$\alpha = \tan^{-1}(3/12) = 14.04 \text{ degrees}$$

Secondly, the step S100 computes an angle "β" concerning the light receiving system. As shown in FIG. 3, the angle "β" is defined between the horizontal direction (the x-axis direction) and the line connecting the centers of the photo detecting pixels "10" and "32". Specifically, the step S100 computes the angle "β" according to the following equation.

$$\beta = \tan^{-1}(1/6) = 9.46 \text{ degrees}$$

Then, the step S100 calculates the difference "γ" between the angles "α" and "β". The calculated difference "γ" is equal to 4.58 degrees. The step S100 defines the calculated difference "γ" as an angular error between the light emitting system and the light receiving system.

Between the light emitting system and the light receiving system, there is a translational position error such that the actually corresponding pixel "10" separates from the ideally corresponding pixel "1" concerning the prescribed forward beam direction "A" (the right-lower corner segment "A" of the detection area). Between the light emitting system and the light receiving system, there is a rotational position error corresponding to an angular difference of 4.58 degrees.

A step S110 following the step S100 computes the actual correspondence relation between the 28 forward beam directions "A", ..., and "AB" and the pixels of the photodetector array 43 on the basis of the results of the calculations by the steps S90 and S100. A consideration is given of a prescribed forward beam direction corresponding to a segment of the detection area which is m-segment spaced from the right-lower corner segment "A" along the horizontal direction, and which is n-segment spaced therefrom along the vertical direction. With respect to the forward laser beam, there is a difference of m·2 degrees along the horizontal direction between the considered segment and the right-lower corner segment "A". There is a difference of n·1 degrees along the vertical direction between the considered segment and the right-lower corner segment "A". An inter-segment horizontal difference of m·2 degrees is converted into a horizontal distance of m·2·0.492 mm on the photodetector array 43. An inter-segment vertical difference of n·1 degrees is converted into a vertical distance of n·1·0.492 mm on the photodetector array 43. In view of the angular error "γ", a horizontal displacement HD and a vertical displacement VD on the photodetector array 43 which correspond to a horizontal distance of m·2·0.492 mm and a vertical distance of n·1·0.492 mm are given as follows:

$$HD: m\cdot 2\cdot 0.492\cdot \cos\gamma + n\cdot 1\cdot 0.492\cdot \sin\gamma \text{[mm]}$$

$$VD: n\cdot 1\cdot 0.492\cdot \cos\gamma - m\cdot 2\cdot 0.492\cdot \sin\gamma \text{[mm]}$$

The step S110 determines one among the pixels of the photodetector array 43 which is located at a position determined by the horizontal displacement HD and the vertical displacement VD. The step S110 defines the determined pixel as actually corresponding to the considered forward beam direction. The step S110 iterates the above-mentioned procedure while sequentially changing the considered forward beam direction among the 28 directions "A", ..., and "AB". As a result, the step S110 determines the pixels of the photodetector array 43 which actually correspond to the 28 forward beam directions "A", ..., and "AB" respectively. In this way, the step S110 computes the actual correspondence relation between the 28 forward beam directions "A", ..., and "AB" and the pixels of the photodetector array 43.

FIG. 7 shows the relation among the 28 forward beam directions "A", ..., and "AB", horizontal displacements (distances) from the right-lower corner direction "A", vertical displacements (distances) from the right-lower corner direction "A", horizontal displacements from the left-upper corner pixel "10", vertical displacements from the left-upper corner pixel "10", and the identification numbers of pixels of the photodetector array 43 which actually correspond to the 28 forward beam directions "A", ..., and "AB" respectively. The relation in FIG. 7 contains the actual correspondence relation between the 28 forward beam directions "A", ..., and "AB" and the pixels of the photodetector array 43.

A step S120 subsequent to the step S110 loads the nonvolatile memory with data representing the actual correspondence relation between the 28 forward beam directions "A", ..., and "AB" and the pixels of the photodetector array 43. The nonvolatile memory is within or outside the processor section 33. The step S120 executes a process of allowing the actual correspondence relation between the 28 forward beam directions "A", ..., and "AB" and the pixels of the photodetector array 43 to be used in later distance measurement. Specifically, the step S120 sets the relation designating flag FG to "1". After the step S120, the current execution cycle of the program segment ends.

During distance measurement, each photo detecting pixel expected to receive an echo laser beam is identified by referring to either the standard correspondence relation between the 28 forward beam directions "A", ..., and "AB" and the pixels of the photodetector array 43 or the actual correspondence relation therebetween. Each identified pixel is selected as an effective pixel. The reference to the actual correspondence relation compensates for insufficient consistency in optical-axis position and angle between the light emitting system and the light receiving system. Accordingly, insufficient consistency in optical-axis position and angle between the light emitting system and the light receiving system is allowed. Thus, it is unnecessary to accurately and finely adjust relative optical-axis position and angle between the light emitting system and the light receiving system. Therefore, the assembly of the distance measuring apparatus 1 is relatively easy, and the manufacture cost of the apparatus 1 is relatively low.

FIG. 13 is a flowchart of a segment of the control program for the processor section 33 which relates to distance measurement. The program segment in FIG. 13 is executed after the adjustment mode of operation of the distance measuring apparatus 1 has finished. The program segment in FIG. 13 provides every scanning of the detection area. Serial identification numbers of "1", "2", ..., and "28" are previously assigned to the prescribed forward beam directions "A", "B", ..., and "AB", respectively.

As shown in FIG. 13, a first step S301 of the program segment initializes a variable RN to "1". The variable RN is used as an indication of the identification number of one selected among the 28 forward beam directions "A", "B", ..., and "AB". After the step S301, the program advances to a step S302.

The step S302 controls the scanner 40 to set a forward laser beam direction to one of the prescribed directions "A", "B", ..., and "AB" which has an identification number equal to the value RN. The forward beam direction having an identification number equal to the value RN is referred to as the forward beam direction of interest.

A step S303 following the step S302 determines whether or not the relation designating flag FG is "0". When the relation designating flag FG is "0", the program advances from the step S303 to a step S304. Otherwise, the program advances from the step S303 to a step S305.

The step S304 retrieves, from the nonvolatile memory, the data representing the standard correspondence relation between the 28 forward beam directions "A", ..., and "AB" and the pixels of the photodetector array 43. The step S304 identifies one among the pixels of the photodetector array 43, which corresponds to the forward beam direction of interest, by referring to the standard correspondence relation between the prescribed forward beam directions and the photo detecting pixels. After the step S304, the program advances to a step S306.

The step S305 retrieves, from the nonvolatile memory, the data representing the actual correspondence relation between the 28 forward beam directions "A", ..., and "AB" and the pixels of the photodetector array 43. The step S304 identifies one among the pixels of the photodetector array 43, which corresponds to the forward beam direction of interest, by referring to the actual correspondence relation between the prescribed forward beam directions and the photo detecting pixels. After the step S305, the program advances to the step S306.

The step S306 controls the pixel selector 50 to select the identified photo detecting pixel as an effective pixel (an actually used pixel).

A step S307 following the step S306 controls the LD driver 40 to emit a pulse of a forward laser beam in the direction set by the step S302. As a result, the forward laser pulse beam is applied to the detection-area segment corresponding to the forward beam direction of interest. The step S307 controls the time measuring circuit 61 to start time measurement.

A step S308 subsequent to the step S307 accepts time-difference data TD(RN) from the time measuring circuit 61 which relates to the forward beam direction of interest. The step S308 stores the accepted time-difference data TD(RN) into the RAM.

A step S309 following the step S308 determines whether or not the value RN is "28". When the value RN is equal to "28", the program advances from the step S309 to a step S310. Otherwise, the program advances from the step S309 to a step S311.

The step S311 increments the value RN by "1". After the step S311, the program returns to the step S302.

The step S310 retrieves the time-difference data TD(1), TD(2), ..., and TD(28) which relate to the prescribed forward beam directions "A", "B", ..., and "AB" respectively. The step S310 calculates the distance and direction to an object (or the distances and directions to respective objects) on the basis of the time-difference data TD(1), TD(2), ..., and TD(28). Accordingly, the step S310 generates data representing the calculated distance and direction to the object. After the step S310, the current execution cycle of the program segment ends.

The scanning mechanism 35, the laser diode 39, and the LD driver 40 correspond to scanning and applying means. The light receiving lens 41 and the photodetector array 43 correspond to reflected light receiving means. The time measuring circuit 61 corresponds to time difference measuring means. The processor section 33 corresponds to distance calculating means. The processor section 33 and the pixel selector 50 correspond to changing and selecting means. The processor section 33 corresponds to correspondence relation grasping means. Specifically, the program segment in FIG. 6 corresponds to the correspondence relation grasping means.

Second Embodiment

A second embodiment of this invention is similar to the first embodiment thereof except for design changes mentioned hereafter. The second embodiment of this invention uses steps S190, S200, S210, S220, S230, and S240 instead of the steps S90, S100, S110, and S120 in FIG. 6.

Figure 8:
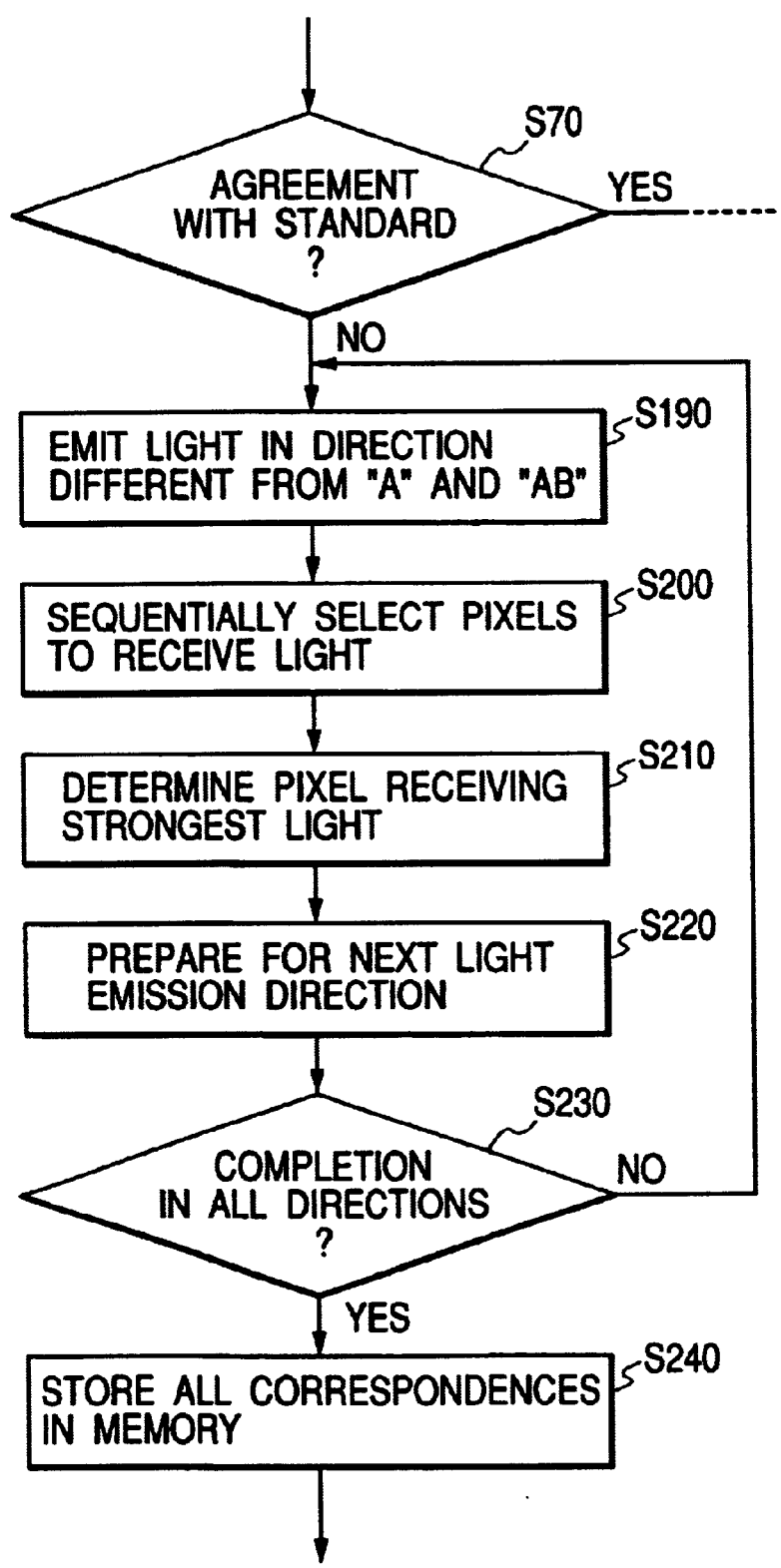
FIG. 8 is a flowchart of a portion of an adjustment-related segment of a control program for a processor section in a second embodiment of this invention.

FIG. 8 shows the steps S190, S200, S210, S220, S230, and S240. With reference to FIG. 8, the step S190 following the step S70 or the step S230 controls the LD driver 40 and the scanner 40 to emit a forward laser beam in one of the prescribed directions except the right-lower corner direction "A" and the left-upper corner direction "AB". As will be made clear later, the step S190 is iteratively executed. The direction of the forward laser beam is sequentially changed from one to another while the step S190 is iterated. For example, at the first execution of the step S190, the forward laser beam is emitted in the prescribed direction "B". At the second execution of the step S190, the forward laser beam is emitted in the prescribed direction "C". At the last execution of the step S190, the forward laser beam is emitted in the prescribed direction "AA".

The step S200 subsequent to the step S190 controls the pixel selector 50 to sequentially select one among candidate photo detecting pixels as an effective pixel. The candidate pixels include the pixel ideally corresponding to the present direction of the forward laser beam, and also the pixels neighboring the ideally corresponding pixel. The step S200 detects the intensity of a received echo laser beam from the output signal of the amplifier 53 for each candidate pixel selected. Thus, the step S200 provides the detected echo intensities for the candidate pixels respectively.

The step S210 following the step S200 compares the detected echo intensities to decide the greatest thereof. The step S210 determines one among the candidate pixels which relates to the greatest echo intensity. The step S210 considers the greatest-echo-intensity candidate pixel to be in actual correspondence with the present direction of the forward laser beam. Specifically, the step S210 regards the identification number of the greatest-echo-intensity candidate pixel as actually corresponding to the present direction of the forward laser beam. The step S210 loads the RAM with a signal representing the identification number of the greatest-echo-intensity candidate pixel, that is, the identification number of the pixel actually corresponding to the present direction of the forward laser beam.

The step S220 subsequent to the step S210 controls the scanner 40 to prepare the emission of the forward laser beam in a next direction.

The step S230 following the step S220 determines whether or not the detection has been completed about the pixels of the photodetector array 43 which actually correspond to all the prescribed forward beam directions except the right-lower corner direction "A" and the left-upper corner direction "AB". When the detection has been completed, the program advances from the step S230 to the step S240. Otherwise, the program returns from the step S230 to the step S190.

The step S240 loads the nonvolatile memory with data representing the actual correspondence relation between the 28 forward beam directions "A", ..., and "AB" and the pixels of the photodetector array 43. The nonvolatile memory is within or outside the processor section 33. The step S240 executes a process of allowing the actual correspondence relation between the 28 forward beam directions "A", ..., and "AB" and the pixels of the photodetector array 43 to be used in later distance measurement. After the step S240, the current execution cycle of the program segment ends.

Third Embodiment

A third embodiment of this invention is similar to the first embodiment thereof except that the adjustment mode of operation of the distance measuring apparatus 1 is modified as follows.

During the emission of a forward laser beam in each of the 28 prescribed directions "A", ..., and "AB", that is, during the application of a forward laser beam to each of the 28 segments "A", ..., and "AB" of the detection area, detection is made as to one or more of the 40 pixels of the photodetector array 43 which receive a corresponding echo laser beam. The configuration of the pixels receiving the corresponding echo laser beam is determined. Calculation is made as to the position of the center of gravity of the determined configuration. One among the 40 pixels of the photodetector array 43 which contains the calculated gravity-center position is decided to be in actual correspondence with the present direction of the forward laser beam.

In the case where the calculated gravity-center position is on the boundary between the pixel "1" and the pixel "2" of the photodetector array 43, the pixel "1" is decided to be in actual correspondence with the present direction of the forward laser beam. Similarly, in the case where the calculated gravity-center position is on the boundary between the pixel "1" and the pixel "9" of the photodetector array 43, the pixel "1" is decided to be in actual correspondence with the present direction of the forward laser beam.

Fourth Embodiment

A fourth embodiment of this invention is similar to the first embodiment thereof except for a design change mentioned hereafter. The fourth embodiment of this invention uses the prescribed forward beam direction "G" as a second adjustment-base direction instead of the prescribed forward beam direction "AB" in the adjustment mode of operation of the distance measuring apparatus 1. The prescribed forward beam direction "G" corresponds to the left-lower corner of the detection area.

Fifth Embodiment

A fifth embodiment of this invention is similar to the first embodiment thereof except for a design change mentioned hereafter. The fifth embodiment of this invention uses four among the 28 forward beam directions "A", ..., and "AB" as four adjustment-base directions in the adjustment mode of operation of the distance measuring apparatus 1. Thus, the number of adjustment-base directions is increased from two to four. Preferably, the right-lower corner direction "A", the left-lower corner direction "G", the right-upper corner direction "V", and the left-upper corner direction "AB" are used as four adjustment-base directions.

Sixth Embodiment

A sixth embodiment of this invention is similar to the first embodiment thereof except that the steps S70 and S80 are omitted from the program segment in FIG. 6. In the sixth embodiment of this invention, the step S60 is followed by the step S90.

Seventh Embodiment

A seventh embodiment of this invention is similar to the first embodiment thereof except for design changes mentioned hereafter. In the seventh embodiment of this invention, each of the first and second adjustment-base segments (the right-lower corner segment "A" and the left-upper corner segment "AB") of the detection area is divided into 5 sub-segments sequentially arranged along the horizontal direction. Each of the 5 sub-segments has a horizontal dimension corresponding to 0.4 degree. The forward laser beam used during the adjustment mode of operation of the distance measuring apparatus 1 is designed so that its cross section has a horizontal dimension corresponding to 0.4 degree.

For example, the right-lower corner segment "A" of the detection area is composed of 5 sub-segments A1, A2, A3, A4, and A5 sequentially arranged in that order along the horizontal direction.

The step S10 in FIG. 6 controls the LD driver 40 and the scanner 40 to emit a forward laser beam in a direction corresponding to the central sub-segment A3. Thus, the forward laser beam is applied only to the central sub-segment A3.

Alternatively, the step S10 may control the LD driver 40 and the scanner 40 to sequentially apply a forward laser beam to the sub-segments A1 and A5. The step S10 may control the LD driver 40 and the scanner 40 to sequentially apply a forward laser beam to the sub-segments A1, A3, and A5. The step S10 may control the LD driver 40 and the scanner 40 to sequentially apply a forward laser beam to the sub-segments A1, A2, A3, A4, and A5.

In the case where the forward laser beam is sequentially applied to two or more of the sub-segments A1–A5, a photo detecting pixel which is the greatest in number of times of the reception of a corresponding echo laser beam is decided to be in actual correspondence with the prescribed forward beam direction "A" (the first adjustment-base direction). A photo detecting pixel which contains the center of gravity of the configuration of echo-receiving pixels may be decided to be in actual correspondence with the prescribed forward beam direction "A".

Eighth Embodiment

An eighth embodiment of this invention is similar to the first embodiment thereof except that the photodetector array 43 has only one line of photo detecting pixels arranged along the horizontal direction.

Ninth Embodiment

Figure 9:
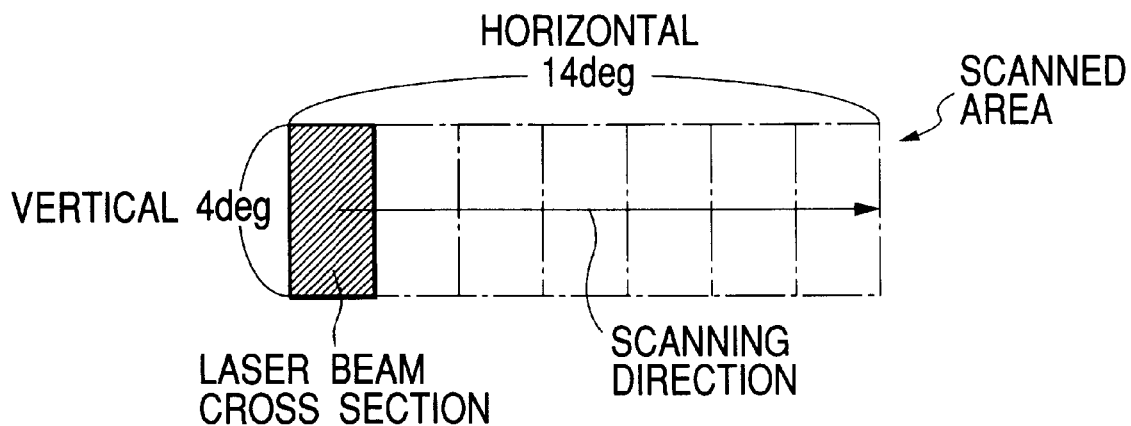
FIG. 9 is a diagram of a laser-beam cross section and a detection area in a ninth embodiment of this invention.

A ninth embodiment of this invention is similar to the first embodiment thereof except for design changes mentioned hereafter. In the ninth embodiment of this invention, as shown in FIG. 9, the detection area has a horizontal dimension corresponding to 14 degrees and a vertical dimension corresponding to 4 degrees. The diaphragm 45 and the projector lens 46 are designed to generate a forward pulse laser beam of a rectangular cross section having a horizontal dimension corresponding to 2 degrees and a vertical dimension corresponding to 4 degrees (see FIG. 9). Thus, the forward laser pulse beam covers the vertical 4-degree dimension of the detection area.

With reference to FIG. 9, the detection area is divided into 7 segments sequentially arranged in the horizontal direction. Each of the 7 segments has a horizontal dimension corresponding to 2 degrees and a vertical dimension corresponding to 4 degrees. During distance measurement, the 7 segments of the detection area are sequentially exposed to the forward laser pulse beam. A plurality of pulses of the forward laser beam is applied to each of the 7 segments.

Figure 10:
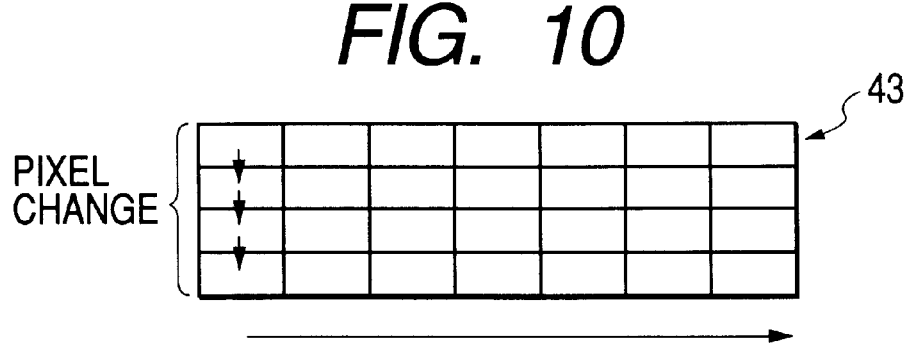
FIG. 10 is a diagram of a matrix pixel array in the ninth embodiment of this invention.

As shown in FIG. 10, the photodetector array 43 has a two-dimensional matrix of 28 photo detecting pixels being 7 pixels in the horizontal direction (the x-axis direction) by 4 pixels in the vertical direction (the y-axis direction).

During the distance measurement, the processor section 33 drives the scanner 49, thereby swinging the mirror 47 and causing the forward laser pulse beam to scan the detection area. The direction of the travel of the forward laser pulse beam is changed to cover the detection area.

Figure 11:
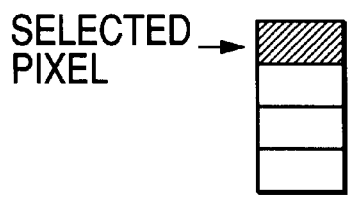
FIG. 11 is a diagram of photo detecting pixels in one column (one vertical-direction pixel group) in the matrix pixel array of FIG. 10.
Figure 12:
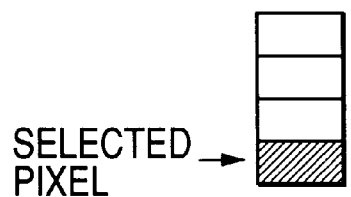
FIG. 12 is a diagram of photo detecting pixels in one column (one vertical-direction pixel group) in the matrix pixel array of FIG. 10.

For a same angular direction, a plurality of pulses of the forward laser beam are successively applied to the detection area. In this case, regarding the sequential application of the pulses of the forward laser beam, the selected pixel (the effective pixel or the actually used pixel) is sequentially changed among the pixels in a vertical-direction pixel group in the photodetector array 43 while photo detection and distance measurement are implemented. As shown in FIG. 10, the selected pixel is sequentially changed among the pixels along the downward direction. Specifically, at a first stage, the uppermost pixel is selected as an effective pixel (an actually used pixel) is shown in FIG. 11. At a second stage, the second uppermost pixel is selected as an effective pixel. At a third stage, the second lowermost pixel is selected as an effective pixel. At a fourth stage, the lowermost pixel is selected as an effective pixel as shown in FIG. 12.

As previously mentioned, the angular dimensions of the detection area are 4 degrees in the vertical direction (the vehicle height direction), and 14 degrees in the horizontal direction (the lateral direction or the vehicle width-wise direction). As an object moves upward in the detection area, the position of a pixel receiving a related echo laser beam moves downward in the photodetector array 43. As the object moves downward in the detection area, the position of a pixel receiving the related echo laser beam moves upward in the photodetector array 43. Therefore, the distance to an object in a lower part of the detection area can be measured even when only the uppermost pixel is selected as an effective pixel (an actually used pixel) as shown in FIG. 11. The distance to an object in an upper part of the detection area can be measured even when only the lowermost pixel is selected as an effective pixel as shown in FIG. 12.

During the scanning of the detection area, the forward laser pulse beam is moved along the horizontal direction (the lateral direction or the vehicle width-wise direction). While the forward laser pulse beam remains in a same angular direction, the selected pixel (the effective pixel) is sequentially changed among the same-group pixels along the vertical direction (the vehicle height direction) perpendicular to the horizontal direction. Thus, information of the position of an object in the vertical direction (the vehicle height direction) is available although the forward laser pulse beam is moved one-dimensionally along the horizontal direction. Also, the scanning of the detection area by the forward laser pulse beam provides information of the position of the object in the horizontal direction (the lateral direction or the vehicle width-wise direction). Therefore, two-dimensional positional information of the object is available although the forward laser pulse beam is moved only one-dimensionally along the horizontal direction.

Tenth Embodiment

A tenth embodiment of this invention is similar to the first embodiment thereof except for design changes mentioned hereafter. The tenth embodiment of this invention is designed so that each of the prescribed forward beam directions (or each of the segments of the detection area) corresponds to four among the photo detecting pixels of the photodetector array 43.

The number of candidate photo detecting pixels used by each of the steps S20 and S50 in FIG. 6 is equal to more than four. The step S30 in FIG. 6 determines four among the candidate pixels which relate to the first, second, third, and fourth greatest echo intensities. The step S30 considers the four greatest-echo-intensity candidate pixels to be in actual correspondence with the prescribed forward beam direction "A". The step S60 in FIG. 6 determines four among the candidate pixels which relate to the first, second, third, and fourth greatest echo intensities. The step S60 considers the four greatest-echo-intensity candidate pixels to be in actual correspondence with the prescribed forward beam direction "AB".

Eleventh Embodiment

An eleventh embodiment of this invention is similar to the first embodiment thereof except that the pixel matrix forming the photodetector array 43 is of 54 photo detecting pixels being 9 pixels in the horizontal direction (the x-axis direction) by 6 pixels in the vertical direction (the y-axis direction). The left edge column, the right edge column, the upper edge row, and the lower edge row of pixels are assigned to surpluses. The pixel matrix forming the photodetector array 43 may be of more than 54 photo detecting pixels.

What is claimed is:

1. A distance measuring apparatus comprising:

scanning and applying means for applying a forward laser beam to a prescribed detection area, and controlling the forward laser beam to scan the detection area along a scanning direction;

reflected light detecting means for receiving an echo laser beam caused by reflection of the forward laser beam at an object, the reflected light detecting means including a photodetector array in which a plurality of photo detecting elements are arranged in at least one of the scanning direction and a direction perpendicular to the scanning direction, the photodetector array having a visual field wider than a visual field corresponding to the detection area;

changing and selecting means for selecting at least one among the photo detecting elements as an effective element and changing the effective element from one to another in response to a direction of the application of the forward laser beam;

time difference measuring means for measuring a time difference between a moment of the application of the forward laser beam by the scanning and applying means and a moment of the reception of the echo laser beam by the reflected light receiving means;

distance calculating means for calculating one of (1) a distance to the object and (2) a physical quantity indicative of the distance to the object on the basis of the time difference measured by the time difference measuring means; and correspondence relation grasping means for identifying at least one among the photo detecting elements which receives an echo laser beam corresponding to the forward laser beam applied in a specified direction, and for grasping an actual correspondence relation between directions of the application of the forward laser beam and the photo detecting elements receiving corresponding echo laser beams on the basis of a relation between the identified photo detecting element and the specified direction;

wherein the changing and selecting means includes means for selecting at least one among the photo detecting elements as an effective element and changing the effective element from one to another in response to the direction of the application of the forward laser beam according to the actual correspondence relation grasped by the correspondence relation grasping means.

2. A distance measuring apparatus as recited in claim 1, wherein the correspondence relation grasping means includes (1) means for identifying first one among the photo detecting elements which receives an echo laser beam corresponding to the forward laser beam applied in a first specified direction, (2) means for identifying second one among the photo detecting elements which receives an echo laser beam corresponding to the forward laser beam applied in a second specified direction different from the first specified direction, and (3) means for estimating one among the photo detecting elements which receives an echo laser beam corresponding to the forward laser beam applied in each of directions different from the first and second specified directions on the basis of a relation between the first and second identified photo detecting elements and the first and second specified directions.

3. A distance measuring apparatus as recited in claim 2, wherein the first and second specified directions are two among different directions of the application of the forward laser beam, and an angular difference between the two directions is a greatest.

4. A distance measuring apparatus as recited in claim 2, wherein the photodetector array includes a matrix array of photo detecting elements arranged in the scanning direction and also in the direction perpendicular to the scanning direction, wherein the scanning and applying means includes means for controlling the forward laser beam to scan the detection area along the scanning direction and also along the direction perpendicular to the scanning direction, and wherein the first and second specified directions correspond to corners of the detection area respectively.

5. A distance measuring apparatus as recited in claim 1, wherein the correspondence relation grasping means includes (1) means for identifying first one among the photo detecting elements which receives an echo laser beam corresponding to the forward laser beam applied in a first specified direction, (2) means for identifying second one among the photo detecting elements which receives an echo laser beam corresponding to the forward laser beam applied in a second specified direction different from the first specified direction, (3) means for identifying third one among the photo detecting elements which receives an echo laser beam corresponding to the forward laser beam applied in a third specified direction different from the first and second specified directions, (4) means for identifying fourth one among the photo detecting elements which receives an echo laser beam corresponding to the forward laser beam applied in a fourth specified direction different from the first, second, and third specified directions, and (5) means for estimating one among the photo detecting elements which receives an echo laser beam corresponding to the forward laser beam applied in each of directions different from the first, second, third, and fourth specified directions on the basis of a relation between the first, second, third, and fourth identified photo detecting elements and the first, second, third, and fourth specified directions, wherein the photodetector array includes a matrix array of photo detecting elements arranged in the scanning direction and also in the direction perpendicular to the scanning direction, wherein the scanning and applying means includes means for controlling the forward laser beam to scan the detection area along the scanning direction and also along the direction perpendicular to the scanning direction, and wherein the first, second, third, and fourth specified directions correspond to corners of the detection area respectively.

6. A distance measuring apparatus as recited in claim 1, wherein the correspondence relation grasping means includes (1) means for identifying one among the photo detecting elements which receives an echo laser beam corresponding to the forward laser beam applied in each of all directions of the application of the forward laser beam, and (2) means for grasping the actual correspondence relation on the basis of the identified photo detecting elements.

7. A distance measuring apparatus as recited in claim 1, wherein the correspondence relation grasping means includes (1) means for storing data representing an ideal correspondence relation between directions of the application of the forward laser beam and the photo detecting elements receiving corresponding echo laser beams, (2) means for identifying one among the photo detecting elements which receives an echo laser beam corresponding to the forward laser beam applied in each of at least two different specified directions, (3) means for determining whether or not a relation between the identified photo detecting elements and the specified directions is accorded with the ideal correspondence relation, (4) means for, in cases where it is determined that the relation between the identified photo detecting elements and the specified directions is accorded with the ideal correspondence relation, setting the ideal corresponding relation as the actual correspondence relation, and (5) means for, in cases where it is determined that the relation between the identified photo detecting elements and the specified directions is not accorded with the ideal correspondence relation, grasping the actual correspondence relation on the basis of the relation between the identified photo detecting elements and the specified directions.

8. A distance measuring apparatus as recited in claim 1, wherein the correspondence relation grasping means includes means for implementing the identification of the photo detecting element in response to intensities of echo laser beams received by the respective photo detecting elements.

9. A distance measuring apparatus as recited in claim 1, wherein the correspondence relation grasping means includes means for implementing the identification of the photo detecting element in response to a center of gravity of a configuration of photo detecting elements receiving respective portions of an echo laser beam.

10. A distance measuring apparatus as recited in claim 1, wherein the photodetector array includes a matrix array of photo detecting elements arranged in the scanning direction and also in the direction perpendicular to the scanning direction, and wherein the scanning and applying means includes means for controlling the forward laser beam to scan the detection area along the scanning direction and also along the direction perpendicular to the scanning direction.

11. A distance measuring apparatus as recited in claim 1, wherein the forward laser beam is of a cross section having a first dimension along the scanning direction and a second dimension along the direction perpendicular to the scanning direction, and the second dimension is greater than the first dimension, and wherein the photodetector array includes a plurality of photo detecting elements arranged in the direction perpendicular to the scanning direction.

12. A distance measuring apparatus as recited in claim 1, wherein the changing and selecting means includes means for individually selecting one among the photo detecting elements as an effective element and changing the effective element from one to another in response to the direction of the application of the forward laser beam.

13. A distance measuring apparatus as recited in claim 1, which is mounted on a vehicle, wherein the scanning direction is equal to one of (1) a direction along a width of the vehicle and (2) a direction along a height of the vehicle.

14. A radar apparatus comprising:
a photodetector array including a plurality of photo detecting pixels;
first means for emitting a forward laser beam in specified one among prescribed forward beam directions and detecting one among the photo detecting pixels of the photodetector array which receives an echo laser beam caused by reflection of the emitted forward laser beam at an object, the prescribed forward beam directions corresponding to segments of a prescribed detection area respectively;
second means for determining a correspondence relation between the prescribed forward beam directions and the photo detecting pixels of the photodetector array on the basis of a relation between the specified forward beam direction and the photo detecting pixel detected by the first means, the determined correspondence relation indicating which of the photo detecting pixels is expected to receive an echo laser beam when the forward laser beam is emitted in each of the prescribed forward beam directions;
third means for emitting the forward laser beam and sequentially changing a direction of the emitted forward laser beam among the prescribed forward beam directions to sequentially apply the forward laser beam to the segments of the detection area and thereby scan the detection area; and
fourth means for, when the forward laser beam is emitted in each of the prescribed forward beam directions by the third means, selecting one among the photo detecting pixels of the photodetector array as an effective pixel and setting others of the photo detecting pixels as ineffective pixels in accordance with the correspondence relation determined by the second means.

15. A radar apparatus comprising:
a photodetector array including a plurality of photo detecting pixels;
first means for applying a forward laser beam to specified one among segments of a prescribed detection area and detecting one among the photo detecting pixels of the photodetector array which receives an echo laser beam caused by reflection of the emitted forward laser beam at an object;
second means for determining a correspondence relation between the segments of the detection area and the photo detecting pixels of the photodetector array on the basis of a relation between the specified segment and the photo detecting pixel detected by the first means, the determined correspondence relation indicating which of the photo detecting pixels is expected to receive an echo laser beam when the forward laser beam is applied to each of the segments of the detection area;

third means for sequentially applying the forward laser beam to the segments of the detection area to scan the detection area; and fourth means for, when the forward laser beam is applied to each of the segments of the detection area by the third means, selecting one among the photo detecting pixels of the photodetector array as an effective pixel and setting others of the photo detecting pixels as ineffective pixels in accordance with the correspondence relation determined by the second means.

* * * * *